US006989052B1

(12) United States Patent
Wu et al.

(10) Patent No.: US 6,989,052 B1
(45) Date of Patent: Jan. 24, 2006

(54) PHASE CHANGE INK PRINTING PROCESS

(75) Inventors: Bo Wu, Wilsonville, OR (US); Donald R. Titterington, Newberg, OR (US); Mary Ryan-Hotchkiss, Portland, OR (US)

(73) Assignee: Xerox Corporation, Stamford, CT (US)

( * ) Notice: Subject to any disclaimer, the term of this patent is extended or adjusted under 35 U.S.C. 154(b) by 4 days.

(21) Appl. No.: 10/881,047

(22) Filed: Jun. 30, 2004

(51) Int. Cl.
   *C09D 11/12* (2006.01)

(52) U.S. Cl. .............................. 106/31.29; 106/31.61; 106/31.43; 106/31.75; 106/31.58; 106/31.86

(58) Field of Classification Search ............. 106/31.29, 106/31.61, 31.43, 31.75, 31.58, 31.86
   See application file for complete search history.

(56) References Cited

U.S. PATENT DOCUMENTS

| 3,253,940 A | 5/1966 | Floyd et al. ................. 106/316 |
| 3,622,604 A | 11/1971 | Drawert et al. ........... 260/404.5 |
| 3,653,932 A | 4/1972 | Berry et al. .................. 106/22 |
| 4,066,585 A | 1/1978 | Schepp et al. ................. 260/18 |
| 4,390,369 A | 6/1983 | Merritt et al. ................. 106/31 |
| 4,484,948 A | 11/1984 | Merritt et al. ................. 106/31 |
| 4,684,956 A | 8/1987 | Ball ........................... 346/1.1 |
| 4,830,671 A | 5/1989 | Frihart et al. ................. 106/27 |
| 4,851,045 A | 7/1989 | Taniguchi .................... 106/31 |
| 4,889,560 A | 12/1989 | Jaeger et al. .................. 106/27 |
| 4,889,761 A | 12/1989 | Titterington et al. ......... 428/195 |
| 5,006,170 A | 4/1991 | Schwarz et al. .............. 106/20 |
| 5,151,120 A | 9/1992 | You et al. ..................... 106/27 |
| 5,194,638 A | 3/1993 | Frihart et al. ................. 554/47 |
| 5,221,335 A | 6/1993 | Williams et al. ........... 106/23 A |
| 5,372,852 A | 12/1994 | Titterington et al. ......... 427/288 |
| 5,389,958 A | 2/1995 | Bui et al. .................... 347/103 |
| 5,496,879 A | 3/1996 | Griebel et al. .............. 524/320 |
| 5,621,022 A | 4/1997 | Jaeger et al. ................ 523/161 |
| 5,645,632 A | 7/1997 | Pavlin ...................... 106/31.29 |
| 5,783,657 A | 7/1998 | Pavlin et al. ................ 528/310 |
| 5,863,319 A | 1/1999 | Baker et al. .............. 106/31.29 |
| 6,110,264 A * | 8/2000 | Banning et al. .......... 106/31.29 |
| 6,174,937 B1 | 1/2001 | Banning et al. ............. 523/160 |
| 6,471,758 B1 | 10/2002 | Kelderman et al. ...... 106/31.29 |
| 6,663,703 B1 * | 12/2003 | Wu et al. ................. 106/31.29 |
| 6,673,139 B1 * | 1/2004 | Wu et al. ................. 106/31.29 |

FOREIGN PATENT DOCUMENTS

| EP | 0 206 286 B1 | 5/1990 |
| EP | 0 187 352 B1 | 6/1991 |
| EP | 1 378 551 | 7/2003 |
| WO | WO 94/04619 | 3/1994 |

OTHER PUBLICATIONS

English abstract for German Patent Publication DE 4205636AL.
English abstract for German Patent Publication DE 4205713AL.

* cited by examiner

*Primary Examiner*—J. A. Lorengo
*Assistant Examiner*—Veronica F. Faison
(74) *Attorney, Agent, or Firm*—Judith L. Byorick

(57) ABSTRACT

Disclosed is a phase change ink composition comprising (1) an ink carrier comprising (A) a first component which comprises an ester-amide material, and (B) a second component which comprises either (i) a material selected from the group consisting of urethane compounds, urea compounds, urethane-urea compounds, and mixtures thereof, (ii) a polyalkylene wax, or (iii) a mixture thereof; and (2) a colorant.

23 Claims, No Drawings

PHASE CHANGE INK PRINTING PROCESS

BACKGROUND

Disclosed herein are phase change inks and methods for the use thereof. More specifically, disclosed herein are phase change inks containing ester-amide materials and monoamide materials and used in indirect printing processes. One embodiment is directed to a phase change ink composition comprising (1) an ink carrier comprising (A) a first component which comprises an ester-amide material, and (B) a second component which comprises either (i) a material selected from the group consisting of urethane compounds, urea compounds, urethane-urea compounds, and mixtures thereof, (ii) a polyalkylene wax, or (iii) a mixture thereof; and (2) a colorant. Another embodiment is directed to a process which comprises (a) incorporating into an ink jet printing apparatus a phase change ink composition comprising (1) an ink carrier comprising (A) a first component which comprises an ester-amide material, and (B) a second component which comprises either (i) a material selected from the group consisting of urethane compounds, urea compounds, urethane-urea compounds, and mixtures thereof, (ii) a polyalkylene wax, or (iii) a mixture thereof; and (2) a colorant; (b) melting the ink; (c) causing droplets of the melted ink to be ejected in an imagewise pattern onto an intermediate transfer member; and (d) transferring the ink in the imagewise pattern from the intermediate transfer member to a final recording substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 5,863,319 (Baker et al.), the disclosure of which is totally incorporated herein by reference, discloses a thermally stable ink for use in ink jet printing containing an ester amide resin, a tackifying resin, and a colorant.

U.S. Pat. No. 5,783,657 (Paviin et al.), the disclosure of which is totally incorporated herein by reference, discloses a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50 percent of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium. The gel contains about 5 to 50 percent ester-terminated polyamide, with the remainder preferably being pure hydrocarbon. The gels are useful in formulating personal care products and other articles wherein some degree of gel-like or self-supporting consistency is desired.

U.S. Pat. No. 5,645,632 (Pavlin), the disclosure of which is totally incorporated herein by reference, discloses solid diesters for hot-melt inks prepared by reaction of polymerized fatty acid with long chain primary monohydric alcohols, optionally in the presence of diamine. The long chain alcohols have at least about 20 carbon atoms, and preferably have 24 or more carbon atoms. The esterification of liquid polymerized fatty acid with monohydric alcohol provides a diester that is solid at room temperature and has a melting point of less than about 150° C. The diester can be formulated with colorants and/or other image-producing materials to provide an ink for hot-melt printing, e.g., hot-melt ink jet, gravure or intaglio printing.

U.S. Pat. No. 5,194,638 (Frihart et al.), the disclosure of which is totally incorporated herein by reference, discloses a resinous binder for use in hot melt ink compositions, which ink compositions may be used in hot melt ink jet printing applications. The resinous binder has a melt viscosity of 250 cps or less at 150° C., is sufficiently transparent to allow a colorant to be distributed through the resinous binder in an amount effective to impart a predetermined color to the resulting hot melt ink composition, and has a blocking temperature greater than 100° C.

U.S. Pat. No. 4,889,560 (Jaeger et al.), the disclosure of which is totally incorporated herein by reference, discloses a phase change ink carrier composition combined with a compatible colorant to form a phase change ink composition. A thin film of substantially uniform thickness of that phase change ink carrier composition, and the ink produced therefrom, has a high degree of lightness and chroma. The thin films of a substantially uniform thickness of the ink composition are also rectilinearly light transmissive. The carrier composition is preferably a fatty amide-containing compound.

U.S. Pat. No. 4,066,585 (Schepp et al.), the disclosure of which is totally incorporated herein by reference, discloses intaglio and flexographic printing processes employing solvent-free inks, solid at room temperature but molten at printing temperatures, and inks suitable therefor, said inks comprising a pigment and a thermoplastic binder having a softening point between 90° C. and 160° C., said binder comprising a synthetic polyamide resin or synthetic polyesteramide resin, each resin being the condensation product of (1) an acid component comprising a dimerized fatty acid and a monocarboxylic acid and (2) an amine component comprising a diamine and, in the case of the polyesteramide resin, additionally comprising a diol and/or alkanolamine.

U.S. Pat. No. 3,622,604 (Drawert et al.), the disclosure of which is totally incorporated herein by reference, discloses synthetic polyamides, useful as binders in the formulation of printing inks, formed between a dimeric fatty acid, an unsubstituted lower aliphatic monocarboxylic acid, ethylene diamine, and certain aromatic, cycloaliphatic, and other aliphatic diamines, including aliphatic ether diamines, and methods for preparing such polyamides.

U.S. Pat. No. 3,253,940 (Floyd et al.), the disclosure of which is totally incorporated herein by reference, discloses polyamide resins and solutions thereof suitable for use as flexographic ink vehicles and alcohol solutions of polyamides obtained by reacting a mixture containing polymeric fat acids, alkylene polyamines, and a low aliphatic monobasic acid.

U.S. Pat. No. 4,830,671 (Frihart et al.), the disclosure of which is totally incorporated herein by reference, discloses an ink composition having the properties of stability and uniformity of performance under ink jet printing conditions and desired printing properties that can be obtained with hot melt ink compositions consisting of a resinous binder comprising a compound of the formula

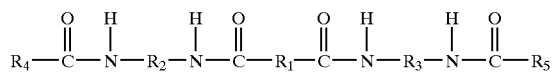

wherein $R_1$ represents a polymerized fatty acid residue with two carboxylic acid groups removed, $R_2$ and $R_3$ are the same or different and each represent an alkylene with up to 12 carbon atoms, a cycloalkylene with 6 to 12 carbon atoms, an arylene with 6 to 12 carbon atoms or an alkarylene with 7 to 12 carbon atoms, and $R_4$ and $R_5$ are the same or different and each represents an alkyl having up to 36 carbon atoms, a cycloalkyl having up to 36 carbon atoms, an aryl having up to 36 carbon atoms, or an alkaryl having up to 36 carbon atoms, said resinous binder having a melt viscosity of less than 250 CPS at 50° C. and a colorant distributed through the resinous binder in an effective amount sufficient to impart a predetermined color to the resulting hot melt ink composition.

U.S. Pat. No. 5,389,958 (Bui et al.), the disclosure of which is totally incorporated herein by reference, discloses a method and the apparatus for employing the method whereby an intermediate transfer surface of a layer of sacrificial liquid is applied to a supporting surface and a phase change ink is deposited on the liquid layer. The inked image is then contact transferred to a final receiving substrate.

U.S. Pat. No. 6,174,937 (Banning et al.), the disclosure of which is totally incorporated herein by reference, discloses a phase change ink comprising a material of the formula

wherein $X_1$, $X_2$, $X_3$, and $X_4$ are segments comprising atoms selected from groups V and VI of the periodic table; wherein at least one $R_1$ and $R_5$ comprises at least 37 carbon units; and wherein $R_2$, $R_3$, and $R_4$ each comprise at least one carbon unit. The invention further encompasses a composition of matter, as well as methods of reducing coefficients of friction of phase change ink formulations.

U.S. Pat. No. 6,471,758 (Kelderman et al.), the disclosure of which is totally incorporated herein by reference, discloses an ink composition for a meltable ink usable in a printing device in which ink drops are ejected from ink ducts, which comprises agents which reversibly cross-link the ink, the said agents containing a gelling agent. When an ink drop which has been transferred to a substrate passes over into a gel during the cooling process, the consequence is that the viscosity of the melted ink drop increases greatly so that the drops become relatively immobile. In this way the ink drops are prevented from uncontrollably flowing into the paper. As a result, inks of this kind are suitable for use on both porous and smooth substrates. In addition, these inks have been found suitable for use in a printing device in which printed substrates are subjected to thermal aftertreatment.

European Patent Publication 1 378 551 (Kremers et al.), the disclosure of which is totally incorporated herein by reference, discloses a meltable ink which is solid at room temperature, which ink is suitable for use in an indirect printing process, in which printing process the ink is transferred, by the use of an inkjet printhead, to a transfer element, whereafter the ink is transferred to a receiving material under pressure from the transfer element, said ink having a composition such that it is pressure-transferable at a temperature between a bottom limit and a top limit, characterised in that the ink has a deformation energy of less than $20 \times 10^5$ Pa·s at a temperature equal to the top limit.

While known compositions are suitable for their intended purposes, a need remains for improved phase change inks. In addition, a need remains for phase change inks wherein the ingredients thereof exhibit good miscibility with each other. Further, a need remains for phase change inks that exhibit good color strength. Additionally, a need remains for phase change inks that print successfully on paper and transparency stock. There is also a need for phase change inks that generate prints with good foldability characteristics. In addition, there is a need for phase change inks that generate prints with good performance in automatic document feeders. Further, there is a need for phase change inks that generate prints having a desirably low coefficient of friction.

SUMMARY

Disclosed herein is a phase change ink composition comprising (1) an ink carrier comprising (A) a first component which comprises an esteramide material, and (B) a second component which comprises either (i) a material selected from the group consisting of urethane compounds, urea compounds, urethane-urea compounds, and mixtures thereof, (ii) a polyalkylene wax, or (iii) a mixture thereof; and (2) a colorant. Another embodiment is directed to a process which comprises (a) incorporating into an ink jet printing apparatus a phase change ink composition comprising (1) an ink carrier comprising (A) a first component which comprises an esteramide material, and (B) a second component which comprises either (i) a material selected from the group consisting of urethane compounds, urea compounds, urethane-urea compounds, and mixtures thereof, (ii) a polyalkylene wax, or (iii) a mixture thereof; and (2) a colorant; (b) melting the ink; (c) causing droplets of the melted ink to be ejected in an imagewise pattern onto an intermediate transfer member; and (d) transferring the ink in the imagewise pattern from the intermediate transfer member to a final recording substrate.

DETAILED DESCRIPTION

The ink compositions used for the present invention comprise an ink carrier containing an ester-amide material. Ester-amide materials suitable for the inks include those prepared by reacting a diacid, triacid, or polyacid (for the purposes herein, a "polyacid" is a molecule including more than three acid groups therein, including both monomeric materials and polymeric materials) or a mixture thereof with a monohydric alcohol and a diamine.

In one embodiment, the di-, tri-, or polyacid comprises two, three, or more carboxylic acid groups bonded to an alkylene group (including linear, branched, saturated, unsaturated, cyclic, substituted, and unsubstituted alkylene groups) said alkylene group in one embodiment having at least 1 carbon atom, in another embodiment at least about 2 carbon atoms, in yet another embodiment at least about 3 carbon atoms, in still another embodiment at least about 4 carbon atoms, in another embodiment at least about 5 carbon atoms, in yet another embodiment at least about 6 carbon atoms, in still another embodiment at least about 7 carbon atoms, in another embodiment at least about 8 carbon atoms, in yet another embodiment at least about 9 carbon atoms, in still another embodiment at least about 10 carbon atoms, in yet another embodiment at least about 12 carbon atoms, in another embodiment at least about 14 carbon atoms, in yet another embodiment at least about 16 carbon atoms, in still another embodiment at least about 18 carbon atoms, in another embodiment at least about 20 carbon atoms, in yet another embodiment at least about 22 carbon atoms, in still another embodiment at least about 24 carbon atoms, in another embodiment at least about 26 carbon atoms, in yet another embodiment at least about 28 carbon atoms, in still another embodiment at least about 30 carbon atoms, in another embodiment at least about 32 carbon atoms, and in yet another embodiment at least about 34 carbon atoms, and in one embodiment no more than about 100 carbon atoms, in another embodiment no more than about 80 carbon atoms, in yet another embodiment no more than about 60 carbon atoms, and in still another embodiment no more than about 50 carbon atoms, although the number of carbon atoms can be outside of these ranges, and wherein the substituents on the alkylene group can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Di-, tri-, and polyacids of this kind can be prepared as described in, for example, U.S. Pat. No. 3,157,681. Mixtures of diacids, triacids, and/or polyacids can also be used.

In a specific embodiment the acid is a diacid of the formula

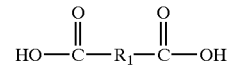

wherein $R_1$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group provided that no hetero atom is directly bonded to either of the carboxylic acid groups), having in one embodiment at least 1 carbon atom, in another embodiment at least about 2 carbon atoms, in yet another embodiment at least about 3 carbon atoms, in still another embodiment at least about 4 carbon atoms, in another embodiment at least about 5 carbon atoms, in yet another embodiment at least about 6 carbon atoms, in still another embodiment at least about 7 carbon atoms, in another embodiment at least about 8 carbon atoms, in yet another embodiment at least about 9 carbon atoms, in still another embodiment at least about 10 carbon atoms, in yet another embodiment at least about 12 carbon atoms, in another embodiment at least about 14 carbon atoms, in yet another embodiment at least about 16 carbon atoms, in still another embodiment at least about 18 carbon atoms, in another embodiment at least about 20 carbon atoms, in yet another embodiment at least about 22 carbon atoms, in still another embodiment at least about 24 carbon atoms, in another embodiment at least about 26 carbon atoms, in yet another embodiment at least about 28 carbon atoms, in still another embodiment at least about 30 carbon atoms, in another embodiment at least about 32 carbon atoms, and in yet another embodiment at least about 34 carbon atoms, and in one embodiment with no more than about 80 carbon atoms, in another embodiment with no more than about 60 carbon atoms, and in yet another embodiment with no more than about 50 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group provided that no hetero atom is directly bonded to either of the carboxylic acid groups), in one embodiment with at least about 6 carbon atoms, in another embodiment with at least about 10 carbon atoms, in yet another embodiment with at least about 14 carbon atoms, in still another embodiment with at least about 16 carbon atoms, in another embodiment with at least about 18 carbon atoms, in yet another embodiment with at least about 20 carbon atoms, in still another embodiment with at least about 22 carbon atoms, in another embodiment with at least about 24 carbon atoms, in yet another embodiment with at least about 26 carbon atoms, in still another embodiment with at least about 28 carbon atoms, in another embodiment with at least about 30 carbon atoms, in yet another embodiment with at least about 32 carbon atoms, and in still another embodiment with at least about 34 carbon atoms, and in one embodiment with no more than about 80 carbon atoms, in another embodiment with no more than about 60 carbon atoms, and in yet another embodiment with no more than about 50 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group provided that no hetero atom is directly bonded to either of the carboxylic acid groups), in one embodiment with at least about 7 carbon atoms, in another embodiment with at least about 12 carbon atoms, in yet another embodiment with at least about 14 carbon atoms, in still another embodiment with at least about 16 carbon atoms, in another embodiment with at least about 18 carbon atoms, in yet another embodiment with at least about 20 carbon atoms, in still another embodiment with at least about 22 carbon atoms, in another embodiment with at least about 24 carbon atoms, in yet another embodiment with at least about 26 carbon atoms, in still another embodiment with at least about 28 carbon atoms, in another embodiment with at least about 30 carbon atoms, in yet another embodiment with at least about 32 carbon atoms, and in still another embodiment with at least about 34 carbon atoms, and in one embodiment with no more than about 80 carbon atoms, in another embodiment with no more than about 60 carbon atoms, and in yet another embodiment with no more than about 50 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group provided that no hetero atom is directly bonded to either of the carboxylic acid groups), in one embodiment with at least about 7 carbon atoms, in another embodiment with at least about 12 carbon atoms, in yet another embodiment with at least about 14 carbon atoms, in still another embodiment with at least about 16 carbon atoms, in another embodiment with at least about 18 carbon atoms, in yet another embodiment with at least about 20 carbon atoms, in still another embodiment with at least about 22 carbon atoms, in another embodiment with at least about 24 carbon atoms, in yet another embodiment with at least about 26 carbon atoms, in still another embodiment with at least about 28 carbon atoms, in another embodiment with at least about 30 carbon atoms, in yet another embodiment with at least about 32 carbon atoms, and in still another embodiment with at least about 34 carbon atoms, and in one embodiment with no more than about 80 carbon atoms, in another embodiment with no more than about 60 carbon atoms, and in yet another embodiment with no more than about 50 carbon atoms, although the number of carbon atoms can be outside of these ranges, such as tolylene or the like, wherein the substituents on the substituted alkylene, arylene, arylalkylene, and alkylarylene groups and be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Since hetero atoms can be included within the alkyl, aryl, arylalkyl, and alkylaryl groups, moieties such as polyethylene oxide chains and polypropylene oxide chains are also included within the scope of $R_1$.

Specific examples of suitable diacids include malonic acid, methyl malonic acid, ethyl malonic acid, butyl malonic acid, dimethyl malonic acid, diethyl malonic acid, succinic acid, methyl succinic acid, dimethyl succinic acid, 2-ethyl-2-methyl succinic acid, 2,3-dimethyl succinic acid, glutaric acid, 2-methyl glutaric acid, 3-methyl glutaric acid, 2,2-dimethyl glutaric acid, 3,3-dimethyl glutaric acid, adipic acid, 3-methyl adipic acid, 3-tert-butyl adipic acid, pimelic acid, suberic acid, azelaic acid, sebacic acid, 1,11-undecanedicarboxylic acid, undecanedioic acid, 1,10-decanedicarboxylic acid, 1,12-dodecanedicarboxylic acid, hexadecanedioic acid, docosanedioic acid, tetracosanedioic acid, itaconic acid, maleic acid, fumaric acid, citraconic acid, mesaconic acid, glutaconic acid, β-hydromuconic acid, traumatic acid, muconic acid, aconitic acid, chlorosuccinic acid, bromosuccinic acid, 2,3-dibromosuccinic acid, tetrafluorosuccinic acid, hexafluoroglutaric acid, perfluoroadipic acid, perfluorosuberic acid, 3-chlorododecanedioic acid, dibromomaleic acid, diglycolic acid, 3,6-dioxaoctanedioic acid, thiodiglycolic acid, 3,3'-thiodipropionic acid, 1,3-acetonedicarboxylic acid, 3-oxoadipic acid, 4-ketopimelic acid, 5-oxoazelaic acid, chelidonic acid, 1,2-cyclopentanedicarboxylic acid, 3,3-tetramethyleneglutaric acid, camphoric acid, cyclohexylsuccinic acid, 1,1-cyclohexanediacetic acid, 1,2-cyclohexanedicarboxylic acid, 1,3-cyclohexanedicarboxylic acid, 1,4-cyclohexanedicarboxylic acid, 1,3-adamantanedicarboxylic acid, 1,3-adamantanediacetic acid, 5-norbornene-2,3-dicarboxylic acid, 1,4,5,6,7,7-hexachloro-5-norbornene-2,3-dicarboxylic acid, phenylsuccinic acid, 3-phenylglutaric acid, 1,2-phenylenediacetic acid, 1,2-phenylenedioxydiacetic acid, homophthalic acid, 1,3-phenylenediacetic acid, 4-carboxyphenoxyacetic acid, 1,4-phenylenediacetic acid, 1,4-phenylenedipropionic acid, 2-carboxycinnamic acid, 1,4-phenylenediacrylic acid, 2-carboxybenzenepropanoic acid, 4,4'-(hexafluoroisopropylidene)bis(benzoic acid), 4,4'-oxybis(benzoic acid), phthalic acid, isophthalic acid, terephthalic acid, 3-fluorophthalic acid, 2-methoxyisophthalic acid, 3-nitrophathalic acid, 4-methylphthalic acid, 2-bromoterephthalic acid, 4-bromoisophthalic acid, 4-nitrophthalic acid, nitroterephthalic acid, 5-tert-butylisophthalic acid, 5-octadecyloxyisophthalic acid, 5-nitroisophthalic acid, 4,5-dichlorophthalic acid, tetrafluoroterephthalic acid, tetrafluoroisophthalic acid, tetrafluorophthalic acid, diphenic acid, 4,4'-biphenyldicarboxylic acid, 4-(4-(2-carboxybenzoyl)phenyl)butyric acid, 1,4-naphthalenedicarboxylic acid, 2,3-naphthalenedicarboxylic acid, 2,6-naphthalenedicarboxylic acid, 2,7-di-tert-butyl-9,9-dimethyl-4,5-xanthenedicarboxylic acid, phenylmalonic acid, benzylmalonic acid, PRIPOL 1006, which is a dimer acid commercially available from Uniqema, Chicago, Ill., believed to be of the general formula

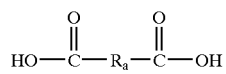

wherein $R_a$ is a branched alkylene group having about 34 carbon atoms and which may include unsaturations and cyclic groups, more specifically a group of the formula $C_{34}H_{62+n}$ wherein n is an integer of 0, 1, 2, 3, 4, 5, 6, 7, 8, 9, or 10, and more specifically believed to include isomers of the formula

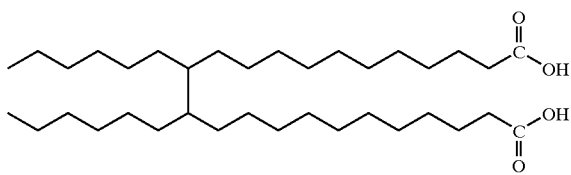

and the like, as well as mixtures thereof.

The monohydric alcohol is of the general formula

wherein $R_2$ is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group provided that no hetero atom is directly bonded to the carboxylic acid group), in one embodiment with at least 1 carbon atom, in another embodiment at least about 2 carbon atoms, in yet another embodiment at least about 3 carbon atoms, in still another embodiment at least about 4 carbon atoms, in another embodiment at least about 5 carbon atoms, in yet another embodiment at least about 6 carbon atoms, in still another embodiment at least about 7 carbon atoms, and in another embodiment at least about 8 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group provided that no hetero atom is directly bonded to the carboxylic acid group), in one embodiment with at least about 6 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group provided that no hetero atom is directly bonded to the carboxylic acid group), in one embodiment with at least about 7 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group provided that no hetero atom is directly bonded to the carboxylic acid group), in one embodiment with at least about 7 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, such as tolyl or the like, wherein the substituents on the substituted alkyl, aryl, arylalkyl, and alkylaryl groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Since hetero atoms can be included within the alkyl, aryl, arylalkyl, and alkylaryl groups, moieties such as polyethylene oxide chains and polypropylene oxide chains are also included within the scope of $R_2$.

Specific examples of suitable monohydric alcohols include methanol, ethanol, 1-propanol, 1-butanol, 1-pentanol, 1-hexanol, 1-heptanol, 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-docosanol, 1-hexacosanol, 1-triacontanol, 2-methyl-1-propanol, neopentyl alcohol, 2-methyl-1-butanol, 3-methyl-1-butanol, 2-ethyl-1-butanol, 3,3-dimethyl-1-butanol, 2-methyl-1-pentanol, 3-methyl-1-pentanol, 4-methyl-1-pentanol, 2-propyl-1-pentanol, 2,4,4-trimethyl-1-pentanol, 2-ethyl-1-hexanol, 3,5,5-trimethyl-1-hexanol, 3,1-dimethyl-1-octanol, 2-propanol, 2-butanol, 2-pentanol, 3-pentanol, 2-hexanol, 3-hexanol, 2-heptanol, 3-heptanol, 2-octanol, 3-octanol, 2-nonanol, 2-decanol, 4-decanol, 2-undecanol, 2-dodecanol, 2-tetradecanol, 2-hexadecanol, 3-methyl-2-butanol, 3,3-dimethyl-2-butanol, 3-methyl-2-pentanol, 4-methyl-2-pentanol, 2-methyl-3-pentanol, 4,4-dimethyl-2-pentanol, 2,2-dimethyl-3-pentanol, 2,4-dimethyl-3-pentanol, 5-methyl-2-hexanol, 2-methyl-3-hexanol, 6-methyl-2-heptanol, 4-methyl-3-heptanol, 2,6-dimethyl-4-heptanol, 2-methyl-2-propanol, tert-amyl alcohol, 2,3-dimethyl-2-butanol, 2-methyl-2-pentanol, 3-methyl-3-pentanol, 3-ethyl-3-pentanol, 2,3-dimethyl-3-pentanol, 3-ethyl-2,2-dimethyl-3-pentanol, 2-methyl-2-hexanol, 3,7-dimethyl-3-octanol, allyl alcohol, 2-methyl-2-propen-1-ol, crotyl alcohol, 3-buten-1-ol, 3-buten-2-ol, 3-methyl-2-buten-1-ol, 2-methyl-3-buten-1-ol, 3-methyl-3-buten-1-ol, 2-methyl-3-buten-2-ol, 2-penten-1-ol, 4-penten-1-ol, 3-penten-2-ol, 4-penten-2-ol, 1-penten-3-ol, 4-methyl-3-penten-1-ol, 3-methyl-1-penten-3-ol, 2-hexen-1-ol, 3-hexen-1-ol, 4-hexen-1-ol, 5-hexen-1-ol, 1-hexen-3-ol, 1-hepten-3-ol, 6-methyl-5-hepten-2-ol, 1-octen-3-ol, beta-citronellol, dihydromyrcenol, 3-nonen-1-ol, 5-decen-1-ol, 9-decen-1-ol, omega-undecylenyl alcohol, 7-dodecen-1-ol, 7-tetradecen-1-ol, 9-tetradecen-1-ol, 11-tetradecen-1-ol, 11-hexadecen-1-ol, phytol, oleyl alcohol, 1,4-pentadien-3-ol, 2,4-hexadien-1-ol, 1,5-hexadien-3-ol, 1,6-heptadien-4-ol, 2,4-dimethyl-2-6-heptadien-1-ol, nerol, geraniol, linalool, 8,10-dodecadien-1-ol, farnesol, cyclopropanemethanol, alpha-methylcyclopropanemethanol, 1-methylcyclopropanemethanol, 2-methylcyclopropanemethanol, cyclobutanol, cyclobutanemethanol, cyclopentanol, cyclopentanemethanol, 3-cyclopentyl-1-propanol, 1-methylcyclopentanol, 2-methylcyclopentanol, 3-methylcyclopentanol, cyclohexanol, cyclohexylmethanol, dicyclohexylmethanol, tricyclohexylmethanol, 2-cyclohexylethanol, 1-cyclohexylethanol, 3-cyclohexyl-1-propanol, 4-cyclohexyl-1-butanol, 1-methylcyclohexanol, 2-methylcyclohexanol, 2-ethylcyclohexanol, 2-tert-butylcyclohexanol, 3-methylcyclohexanol, 4-methylcyclohexanol, 4-ethylcyclohexanol, 4-tert-butylcyclohexanol, 4-tert-amylcyclohexanol, 2,3-dimethylcyclohexanol, menthol, 2,6-dimethylcyclohexanol, 3,5-dimethylcyclohexanol, 3,3,5,5-tetramethylcyclohexanol, cycloheptanol, cycloheptanemethanol, cyclooctanol, cyclododecanol, cyclododecanemethanol, norborneol, 2-norbornanemethanol, 3-methyl-2-norbornanemethanol, fenchyl alcohol, borneol, myrtanol, isopinocampheol, 4-pentylbicyclo(2.2.2)octan-ol, decahydro-1-naphthol, decahydro-2-naphthol, 1-adamantanol, 2-adamantanol, 1-adamantanemethanol, 1-adamantaneethanol, chrysanthemyl alcohol, 2-cyclohexen-1-ol, 3-cyclohexene-1-methanol, 3-methyl-2-cyclohexen-1-ol, 6-methyl-3-cyclohexene-1-methanol, p-menth-1-en-9-ol, alpha-terpineol, terpine-4-ol, dihydrocarveol, isopulegol, 3,5,5-trimethyl-2-cyclohexen-1-ol, perillyl alcohol, carveol, retinol, sclareol, 5-norbornen-2-ol, 5-norbornene-2-methanol, myrtenol, nopol, verbenol, ergocalciferol, 2-fluoroethanol, 2-chloroethanol, 2-bromoethanol, 2-iodoethanol, 2-chloro-1-propanol, 3-chloro-1-propanol, 3-bromo-1-propanol, 3-bromo-2-methyl-1-propanol, 3-chloro-2,2-dimethyl-1-propanol, 3-bromo-2,2-dimethyl-1-propanol, 4-chloro-1-butanol, 6-chloro-1-hexanol, 6-bromo-1-hexanol, 7-bromo-1-heptanol, 8-chloro-1-octanol, 8-bromo-1-octanol, 9-bromo-1-nonanol, 10-chloro-1-decanol, 10-bromo-1-decanol, 11-bromo-1-undecanol, 12-bromo-1-dodecanol, 2,2-dichloroethanol, 2,3-dibromopropanol, 2,2-bis(chloromethyl)-1-propanol, 2,2,2-trifluoroethanol, 2,2,2-trichloroethanol, 2,2,2-tribromoethanol, 2,2,3,3-tetrafluoro-1-propanol, 2,2,3,3,3-pentafluoro-1-propanol, 2,2,3,4,4,4-hexafluoro-1-butanol, 2,2,3,3,4,4,4-heptafluoro-1-butanol, 2,2,3,3,4,4,5,5-octafluoro-1-pentanol, 3,3,4,4,5,5,6,6,7,7,8,8,8-tridecafluoro-1-octanol, 2,2,3,3,4,4,5,5,6,6,7,7,8,8,8-pentadecafluoro-1-octanol, 1-chloro-2-propanol, 1-bromo-2-propanol, 1,3-difluoro-2-propanol, 1,3-dichloro-2-propanol, 1,3-dibromo-2-propanol, 1,4-dibromo-2-butanol, 1,1,1,3,3,3-hexafluoro-2-propanol, 1,1,1,3,3,4,4,4-octafluoro-2-butanol, 1-chloro-2-methyl-2-propanol, 1,1,1-trichloro-2-methyl-2-propanol, perfluoro-tert-butyl alcohol, 2-chloro-2-propen-1-ol, 3-bromo-3-buten-1-ol, 2-chlorocyclohexanol, phenol, o-cresol, 2-ethylphenol, 2-propylphenol, 2-isopropylphenol, 2-sec-butyl phenol, 2-tert-butyl phenol, 2-al lylphenol, 2-propenylphenol, 2-cyclopentylphenol, 2-fluorophenol, alpha,alpha,alpha-trifluoro-o-cresol, 2-chlorophenol, 2-bromophenol, 2-iodophenol, guaiacol, 2-ethoxyphenol, 2-isopropoxyphenol, m-cresol, 3-ethylphenol, 3-isopropylphenol, 3-tert-butyl phenol, 3-pentadecyl phenol, alpha,alpha,alpha-trifluoro-m-cresol, 3-fluorophenol, 3-chlorophenol, 3-bromophenol, 3-iodophenol, 3-methoxyphenol, 3-(trifluoromethoxy)phenol, p-cresol, 4-ethylphenol, 4-propylphenol, 4-isoprophylphenol, 4-sec-butylphenol, 4-tert-butylphenol, 4-tert-amylphenol, 4-octylphenol, 4-tert-octylphenol, nonylphenol, 4-cyclopentylphenol, 4-(1-adamantyl)phenol, alpha,alpha,alpha-trifluoro-p-cresol, 4-fluorophenol, 4-chlorophenol, 4-bromophenol, 4-iodophenol, 4-methoxyphenol, 4-(trifluoromethoxy)phenol, 4-ethoxyphenol, 4-propoxyphenol, 4-butoxyphenol, 4-hexyloxyphenol, 4-heptyloxyphenol, 2,3-dimethylphenol, 5,6,7,8-tetrahydro-1-naphthol, 2,3-dichlorophenol, 2,3-dihydro-2,2-dimethyl-7-benzofuranol, 2,3-dimethoxyphenol, 2,6-dimethoxyphenol, 2,6-diisopropylphenol, di-sec-butylphenol, 2-tert-butyl-6-methylphenol, 2,6-di-tert-butylphenol, 2-allyl-6-methylphenol, 2,6-difluorophenol, 2,3-difluorophenol, 2,6-dichlorophenol, 2,6-dibromophenol, 2-fluoro-6-methoxyphenol, 2,6-dimethoxyphenol, 3,5-dimethylphenol, 5-isopropyl-3-methylphenol, 3,5-di-tert-butylphenol, 3,5-bis(trifluoromethyl)phenol, 3,5-trifluorophenol, 3,5-trichlorophenol, 3,5-dimethoxyphenol, 3-chloro-5-methoxyphenol, 3,4-dimethylphenol, 5-indanol, 5,6,7,8-tetrahydro-2-naphthol, 4-chloro-3-methylphenol, 2,4-dimethylphenol, 2,5-dimethylphenol, thymol, 4-isopropyl-3-methylphenol, carvacrol, 2-tert-butyl-5-methylphenol, 2-tert-butyl-4-methylphenol, 2,4-di-tert-butylphenol, 2,4-di-tert-amylphenol, 2,4-bis(alpha,alpha-dimethylbenzyl)phenol, 2-(1-adamantyl)-4-methylphenol, 4-fluoro-2-methylphenol, 4-fluoro-3-methylphenol, 2-chloro-4-methylphenol, 2-chloro-5-methylphenol, 4-chloro-2-methylphenol, 4-chloro-3-ethylphenol, 2-bromo-4-methylphenol, 4-bromo-3-methylphenol, 4-iodo-2-methylphenol, 2-fluoro-3-(trifluoromethyl)phenol, 2-chloro-3-(trifluoromethyl)phenol, 2-chloro-5-(trifluoromethyl)phenol, 2,4-difluorophenol, 2,5-difluorophenol, 3,4-difluorophenol, 4-chloro-2-fluorophenol, 3-chloro-4-fluorophenol, 4-chloro-3-fluorophenol, 2-bromo-4-fluorophenol, 4-bromo-2-fluorophenol, 2-bromo-5- fluorophenol, 2,4-dichlorophenol, 3,4-dichlorophenol, 2,5-dichlorophenol, 2-bromo-4-chlorophenol, 2-chloro-4-fluorophenol, 4-bromo-2-chlorophenol, 2,4-dibromophenol, 2-methoxy-4-methylphenol, 4-chloro-2-methoxyphenol, 2-chloro-4-methoxyphenol, eugenol, o-eugenol, 2-ethoxy-5-(propenyl)phenol, isoeugenol, 3,4-dimethoxyphenol, 4-allyl-2,6-dimethoxyphenol, sesamol, 2,3,6-trimethylphenol, 2,4-dichloro-3-methylphenol, 2,3,4-trifluorophenol, 2,3,6-trifluorophenol, 2,3,5-trifluorophenol, 2,3,4-trichlorophenol, 2,3,6-trichlorophenol, 2,3,5-trimethylphenol, 3,4,5-trimethylphenol, 4-chloro-3,5-dimethylphenol, 4-bromo-3,5-dimethylphenol, 2,4,6-trimethylphenol, 2,6-di-tert-butyl-4-methyl phenol, 2,6-d i-tert-butyl-4-methoxyphenol, 4-sec-butyl-2,6-di-tert-butylphenol, 2,4,6-tri-tert-butylphenol, 2,4,6-triphenylphenol, 2,4,5-trifluorophenol, 2,4,6-trifluorophenol, 2-chloro-3,5-difluorophenol, 2,4,6-trichlorophenol, 3,4,5-trimethoxyphenol, 2,4-di-tert-butyl-6-(4-methoxybenzyl)phenol, 2,3,5-trichlorophenol, 4-bromo-2,6-dimethylphenol, 4-bromo-2,6-di-tert-butylphenol, 4-bromo-6-chloro-o-cresol, 2,6-dibromo-4-methylphenol, 2,6-dichloro-4-fluorophenol, 2,6-dibromo-4-fluorophenol, 2,4,6-tribromophenol, 2,4,6-triiodophenol, 2-chloro-4,5-dimethylphenol, 4-chloro-2-isopropyl-5-methylphenol, 2-bromo-4,5-difluorophenol, 2,4,5-trichlorophenol, 2,3,5,6-tetrafluorophenol, 3,4,5,6-tetrabromo-o-cresol, 2,3,5,6-tetrafluoro-4-(trifluoromethyl)phenol, pentafluorophenol, pentachlorophenol, pentabromophenol, Vitamin E, 1-naphthol, 2-naphthol, 2-methyl-1-naphthol, 4-chloro-1-naphthol, 2,4-dichloro-1-naphthol, 4-methoxy-1-naphthol, 1-bromo-2-naphthol, 6-bromo-2-naphthol, 1,6-dibromo-2-naphthol, 7-methoxy-2-naphthol, 2-hydroxyfluorene, 9-phenanthrol, 1-hydroxypyrene, 2-hydroxydiphenylmethane, 2-(benzyloxy)phenol, 4-phenoxyphenol, 4-(4-(trifluoromethyl)phenoxy)phenol, 4-(benzyloxy)phenol, 2-phenylphenol, 3-phenylphenol, 4-phenylphenol, 4-(4-bromophenyl)phenol, 2,3,5,6-tetrafluoro-4-(pentafluorophenyl)phenol, 2,6-diphenylphenol, 4-hydroxydiphenylmethane, 4-cumylphenol, 4-chloro-2-(alphamethylbenzyl)phenol, benzyl alcohol, sec-phenethyl alcohol, alpha-(trifluoromethyl)benzyl alcohol, 2-phenyl-2-propanol, 1,2-diphenyl-2-propanol, 2-chloro-1-phenylethanol, 1-phenyl-1-propanol, 2-methyl-1-phenyl-1-propanol, 2,2-dimethyl-1-phenyl-1-propanol, 3-chloro-1-phenyl-1-propanol, 1-phenyl-1-butanol, 1-phenyl-1-decanol, alpha-cyclopropylbenzyl alcohol, cyclopropyldiphenylmethanol, 2-phenyl-1-cyclohexanol, benzhydrol, 1,1-diphenylethanol, triphenylmethanol, 2,2',4,4',4''-pentapentamethoxytriphenylmethanol, 2-phenethylbenzyl alcohol, 1,1,1,3,3,3-hexafluoro-2-phenyl-2-propanol, 2-methylbenzyl alcohol, 2-fluorobenzyl alcohol, 2-(trifluoromethyl)benzyl alcohol, 2-chlorobenzyl alcohol, 2-bromobenzyl alcohol, 2-iodobenzyl alcohol, alpha-methyl-2-(trifluoromethyl)benzyl alcohol, 2-bromo-alpha-methylbenzyl alcohol, 2-methoxybenzyl alcohol, 2-ethoxybenzyl alcohol, 2-methoxy-alpha-methylbenzyl alcohol, 9-hydroxyxanthene, 3-methylbenzyl alcohol, 3-fluorobenzyl alcohol, 3-(trifluoromethyl)benzyl alcohol, alpha-methyl-3-(trifluoromethyl)benzyl alcohol, 3-chlorobenzyl alcohol, 3-bromobenzyl alcohol, 3-iodobenzyl alcohol, 3-methoxybenzyl alcohol, 3-phenoxybenzyl alcohol, 4-methylbenzyl alcohol, 4-ethylbenzyl alcohol, 4-isopropylbenzyl alcohol, 4-tert-butylbenzyl alcohol, 4-butylbenzyl alcohol, 4-fluorobenzyl alcohol, 4-(trifluoromethyl)benzyl alcohol, alpha-methyl-4-(trifluoromethyl)benzyl alcohol, 4-chlorobenzyl alcohol, 4-bromobenzyl alcohol, 4-methoxybenzyl alcohol, 4-ethoxybenzyl alcohol, 4-butoxybenzyl alcohol, 4-(trifluoromethoxy)benzyl alcohol, 4-fluoro-alpha-methylbenzyl alcohol, 1-(4-chlorophenyl) ethanol, 4,4'-difluorobenzhydrol, 4,4'-dichlorobenzhydrol, 4,4'-dichloro-alpha-methylbenzhydrol, 4,4'-dimethoxybenzhydrol, 4-bromo-alpha-methylbenzyl alcohol, 4-methoxy-alpha-methylbenzylalcohol, 2,6-difluorobenzyl alcohol, 2,3-difluorobenzyl alcohol, 2-chloro-6-fluorobenzyl alcohol, 2,6-dichlorobenzyl alcohol, 2,3-dimethoxybenzyl alcohol, 2,4-dimethylbenzyl alcohol, 3,4-dimethylbenzyl alcohol, 2,5-dimethylbenzyl alcohol, 3,4-difluorobenzyl alcohol, 2,4-difluorobenzyl alcohol, 2,5-difluorobenzyl alcohol, 2,4-dichlorobenzyl alcohol, 3,4-dichlorobenzyl alcohol, alpha-(chloromethyl)-2,4-dichlorobenzyl alcohol, 2,5-dichlorobenzyl alcohol, 2,4-dimethoxybenzyl alcohol, 3,4-dimethoxybenzyl alcohol, 2,5-dimethoxybenzyl alcohol, 5-bromo-2-methoxybenzyl alcohol, piperonyl alcohol, 3,5-dimethylbenzyl alcohol, 3,5-bis(trifluoromethyl)benzyl alcohol, 2,4,6-trimethylbenzyl alcohol, 3,5-difluorobenzyl alcohol, 3,5-dichlorobenzyl alcohol, 3,5-dimethoxybenzyl alcohol, 2,3-dimethyl-4-methoxybenzyl alcohol, 2,4-dimethoxy-3-methylbenzyl alcohol, 2,3,4-trimethoxybenzyl alcohol, 3,4,5-trimethoxybenzyl alcohol, 2,4,5-trimethoxybenzyl alcohol, 1-(pentafluorophenyl)ethanol, 2,3,4,5,6-pentafluorobenzyl alcohol, 2,3,4,5,6-pentabromobenzyl alcohol, 4-benzyloxy-3-methoxybenzyl alcohol, 4-biphenylmethanol, 4-stilbenemethanol, 4-benzyloxybenzyl alcohol, 3-benzyloxybenzyl alcohol, 2-methylbenzhydrol, 4-methylbenzhydrol, 4-chlorobenzhydrol, 2,3,4,5,6-pentafluorobenzhydrol, decafluorobenzhydrol, 1-indanol, 2-indanol, 2-bromo-1-indanol, 1-methoxy-2-indanol, 1,2,3,4-tetrahydro-naphthol, 4-chromanol, 2-hydroxymethyl-1,4-benzodioxan, 9-phenylxanthen-9-ol, 2-biphenylmethanol, 2-methyl-3-biphenylmethanol, 1-naphthalenemethanol, 2-naphthalenemethanol, 1-naphthaleneethanol, alpha-methyl-1-naphthalenemethanol, alpha-methyl-2-naphthalenemethanol, 9-hydroxyfluorene, 9-fluorenemethanol, 9-phenyl-9-fluorenol, 1-acenaphthenol, dibenzosuberol, dibenzosuberenol, 9-anthracenemethanol, 10-chloro-9-anthracenemethanol, 2,2,2-trifluoro-1-(9-anthryl)ethanol, 7,8,9,10-tetrahydrobenzo (A) pyren-7-ol, 1-pyrenemethanol, 1-pyrenebutanol, phenethyl alcohol, 1-phenyl-2-propanol, 2-phenyl-1-propanol, 2-methyl-1-phenyl-2-propanol, alpha-ethylphenethyl alcohol, beta-ethylphenethyl alcohol, 2-methoxy-2-phenylethanol, 1-phenyl-2-pentanol, 3-phenyl-1-propanol, 3,3-diphenyl-1-propanol, 2,2-diphenylethanol, 2-(4-chlorophenyl)-1,1-diphenylethanol, 1,1-diphenyl-2-propanol, beta-methoxy-alpha-phenylphenethyl alcohol, 2,2-dimethyl-3-phenyl-1-propanol, aipha,alpha-dimethylbenzenepropanol, 4-phenyl-1-butanol, 3-phenyl-1-butanol, 2-phenyl-2-butanol, 5-phenyl-1-pentanol, 6-phenyl-1-hexanol, 8-phenylmenthol, cinnamyl alcohol, 2-phenyl-3-methyl-2-propen-1-ol, 2-phenoxyethanol, 2-(2,6-diisopropylphenoxy)ethanol, 2-(2-chlorophenoxy)ethanol, 2-(2,3,6-trifluorophenoxy)ethanol, 2-benzyloxyethanol, 1-phenoxy-2-propanol, 1,3-dibenzyloxy-2-propanol, 3-benzyloxy-1-propanol, 5-benzyloxy-1-pentanol, 4-benzyloxy-2-buten-1-ol, 1-phenyl-1-cyclopropanemethanol, 3-phenylglycidol, 2-methyl-3-phenylglycidol, 2-methylphenethyl alcohol, 2-fluorophenethyl alcohol, 2-(trifluoromethyl)phenethyl alcohol, 2-chlorophenethyl alcohol, 2-bromophenethyl alcohol, 2-methoxyphenethyl alcohol, 2-methoxy-2-phenylethanol, 1-(2-methoxyphenyl)-2-propanol, 3-methylphenethyl alcohol, 3-(trifluoromethyl)phenethyl alcohol, 3-fluorophenethyl alcohol, 3-chlorophenethyl alcohol, 3-bromophenethyl alcohol, 3-methoxyphenethyl alcohol, 4-methylphenethyl alcohol, 4-fluorophenethyl alcohol, 4-chlorophenethyl alcohol, 4-bromophenethyl alcohol, 3-(4-bromophenyl)glycidol, 4-methoxyphenethyl alcohol, 3-(4-methoxyphenyl)-1-propanol, 2-(4-bromophenoxy)ethanol, 4-(4-methoxyphenyl)-1-butanol, 4-chloro-alpha,alpha-dimethylphenethyl alcohol, 2,2-bis(4-chlorophenyl)ethanol, 1-(4-chlorophenyl)-1-cyclopentanemethanol, 2,4-dichlorophenethyl alcohol, 3,4-dimethoxyphenethyl alcohol, 4-ethoxy-3-methoxyphenethyl alcohol, 3-(3,4-dimethoxyphenyl)-1-propanol, and the like, as well as mixtures thereof. The diamine has two primary or secondary amine groups thereon. In one embodiment, the diamine has at least about 2 carbon atoms, and in one embodiment no more than about 80 carbon atoms, in another embodiment no more than about 60 carbon atoms, in yet another embodiment no more than about 50 carbon atoms, and in still another embodiment no more than about 36 carbon atoms, although the number of carbon atoms can be outside of these ranges. In a specific embodiment, the amine is a diamine of the formula

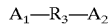

wherein $A_1$ and $A_2$ each, independently of the other, is a primary or secondary amino group and $R_3$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group provided that no hetero atom is directly bonded to either of the carboxylic acid groups), having in one embodiment at least about 2 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group provided that no hetero atom is directly bonded to either of the carboxylic acid groups), in one embodiment with at least about 6 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group provided that no hetero atom is directly bonded to either of the carboxylic acid groups), in one embodiment with at least about 7 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group provided that no hetero atom is directly bonded to either of the carboxylic acid groups), in one embodiment with at least about 7 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, such as tolylene or the like, wherein the substituents on the substituted alkylene, arylene, arylalkylene, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Since hetero atoms can be included within the alkyl, aryl, arylalkyl, and alkylaryl groups, moieties such as polyethylene oxide chains and polypropylene oxide chains are also included within the scope of $R_3$. Examples of diamines having polyalkylene oxide groups therein include the JEFFAMINE® D series available from Huntsman.

Specific examples of suitable diamines include ethylene diamine, 1,3-diaminopropane, 1,2-diaminopropane, 1,4-diaminobutane, 1,2-diamino-2-methylpropane, 1,3-diaminopentane, 1,5-diaminopentane, 2,2-dimethyl-1,3-propanediamine, hexamethylenediamine, 2-methyl-1,5-diaminopentane, 1,7-diaminoheptane, 1,8-diaminooctane, 2,2,4-trimethyl-1,6-diaminohexane, 2,4,4-trimethyl-1,6-diaminohexane, 1,9-diaminononane, 1,10-diaminodecane, 1,12-diaminododecane, N-ethylethylenediamine, N-propylethylenediamine, N-isopropylethylenediamine, N,N'-dimethylethylenediamine, N,N'-diethylethylenediamine, N,N'-diisopropylethylenediamine, N-methyl-1,3-propanediamine, N-propyl-1,3-propanediamine, N-isopropyl-1,3-propanediamine, N,N'-dimethyl-1,3-propanediamine, N,N'-diethyl-1,3-propanediamine, N,N'-diisopropyl-1,3-propanediamine, 2-butyl-2-ethyl-1,5-pentanediamine, N,N'-dimethyl-1,6-hexanediamine, 3,3'-diamino-N-methyldipropylamine, N,N',N"-trimethylbis(hexamethylene)triamine, 5-amino-2,2,4-trimethyl-1-cyclopentanemethylamine, 4,4'-methylenebis(cyclohexylamine), 4,4'-methylenebis(2-methylcyclohexylamine), 1,2-diaminocyclohexane, 1,4-diaminocyclohexane, N,N'-bis(3,3-dimethylbutyl)-1,2-cyclohexanediamine, 1,3-cyclohexanebis(methylamine), N-cyclohexyl-1,3-propanediamine, 1,8-diamino-p-menthane, 5-amino-1,3,3-trimethylcyclohexanemethylamine, N,N'-diethyl-2-butene-1,4-diamine, 2,2'-oxybis(ethylamine), 2,2'-(ethylenedioxy)-bis(ethylamine), 4,9-dioxa-1,12-dodecanediamine, 4,7,10-trioxa-1,13-tridecanediamine, 3-aminopyrrolidine, 2-(aminomethyl)pyrrolidine, 4,4'-bipiperidine, 4,4'-ethylenedipiperidine, 4,4'-trimethylenedipiperidine, 3-aminopiperidine, 4-(aminomethyl)piperidine, 3-(4-aminobutyl)piperidine, 4-amino-2,2,6,6-tetramethylpiperidine, piperazine, 2-methylpiperazine, 2,6-dimethylpiperazine, 2,5-dimethylpiperazine, 1-(2-aminoethyl)piperazine, 1,4-bis(3-aminopropyl)piperazine, homopiperazine, 1,4,10-trioxa-7-13-diazacyclopentadecane, 1,4,10,13-tetraoxa-7,16-diazacyclooctadecane, 1,2-dianilinoethane, 2,2'-ethylenedianiline, 2-aminophenyldisulfide, 4,4'-ethylenedianiline, 3,3'-methylenedianiline, 4,4'-methylenedianiline, 4,4'-methylenebis(3-chloro-2,6-diethylaniline), 4,4'-diaminostilbene, 4,4'-oxydianiline, 4'',4'''-(hexafluoroisopropylidene)-bis(4-phenoxyaniline), 4,4'-thiodianiline, 4-aminophenyldisulfide, o-tolidine, 4,4'-ethylenedi-m-toluidine, 5,5'-(hexafluoroisopropylidene)-di-o-toluidine, 4,4'-methylenebis(2,6-dimethylaniline), 4,4'-methylenebis(2,6-diethylaniline), 4,4'-methylenebis(2,6-diisopropylaniline), 3,3',5,5'-tetramethylbenzidine, 4,4'-diaminooctafluorobiphenyl, 1,2-phenylenediamine, N-methyl-1,2-phenylenediamine, 2,3-diaminotoluene, 3,4-diaminotoluene, 4-chloro-1,2-phenylenediamine, 4-methoxy-1,2-phenylenediamine, 4,5-dimethyl-1,2-phenylenediamine, 4,5-dichloro-1,2-phenylenediamine, N-phenyl-1,2-phenylenediamine, 1,3-phenylenediamine, 2,6-diaminotoluene, 2,4-diaminotoluene, 2,4,6-trimethyl-1,3-phenylenediamine, 4-methoxy-1,3-phenylenediamine, 1,4-phenylenediamine, N,N'-diphenyl-1,4-phenylenediamine, 2,5-diaminotoluene, 2,5-dimethyl-1,4-phenylenediamine, 2-chloro-1,4-phenylenediamine, 2,5-dichloro-1,4-phenylenediamine, 2-methoxy-1,4-phenylenediamine, 2-methoxy-N-phenyl-1,4-phenylenediamine, 2,3,5,6-tetramethyl-1,4-phenylenediamine, N,N'-diphenylbenzidine, N-phenyl-1,4-phenylenediamine, N-methyl-4,4'-methylenedianiline, 3,3'-(hexafluoroisopropylidene)dianiline, 4,4'-(hexafluoroisopropylidene)dianiline, 3,3'-dimethoxybenzidine, N-(4-methoxyphenyl)-1,4-phenylenediamine, N-(1-naphthyl)-ethylenediamine, 3,3'-dimethylnaphthidine, 2,2'-dithiobis(1-naphthylamine), 2,3-diaminonaphthalene, 1,5-diaminonaphthalene, 1,8-diaminonaphthalene, 1,1'-binaphthyl-2,2'-diamine, 2,7-diaminofluorene, 3,7-diamino-2-methoxyfluorene, 9,10-diaminophenanthrene, N-phenylethylenediamine, 1,2-diphenylethylenediamine, 1,2-bis(4-methoxyphenyl)ethylenediamine, N,N'-dibenzylethylenediamine, 2-aminobenzylamine, m-xylylenediamine, N,N'-dimethyl-1,2-bis(3-(trifluoromethyl)phenyl)-1,2-ethanediamine, p-xylylenediamine, 4-aminobenzylamine, 4-(hexadecylamino) benzylamine, 2-(4-aminophenyl)ethylamine, 2-(anilinomethyl)pyrrolidine, 1-[5-chloro-2-(methylamino) phenyl]-1,2,3,4-tetrahydroisoquinoline tartrate, and the like, as well as mixtures thereof.

In one embodiment, the total number of carbon atoms in $R_1+R_2+R_3$ is at least about 72, and in another embodiment is at least about 90, although the total number of carbon atoms can be outside of these ranges. In one embodiment, the total number of carbon atoms in $R_1+R_2+R_3$ is no more than about 260, and in another embodiment is no more than about 150, although the total number of carbon atoms can be outside of these ranges.

In one specific embodiment, the ester-amide is an ester-terminated di-, tri-, or polyamide of the general formula

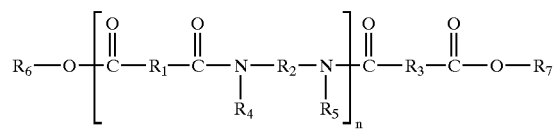

wherein n is an integer of 1, 2, 3, 4, 5, 6, 7, 8, 9, or 10, $R_1$ and $R_3$ each, independently of the other, is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), having in one embodiment at least 1 carbon atom, in another embodiment at least about 2 carbon atoms, in yet another embodiment at least about 3 carbon atoms, in still another embodiment at least about 4 carbon atoms, in another embodiment at least about 5 carbon atoms, in yet another embodiment at least about 6 carbon atoms, in still another embodiment at least about 7 carbon atoms, in another embodiment at least about 8 carbon atoms, in yet another embodiment at least about 9 carbon atoms, in still another embodiment at least about 10 carbon atoms, in yet another embodiment at least about 12 carbon atoms, in another embodiment at least about 14 carbon atoms, in yet another embodiment at least about 16 carbon atoms, in still another embodiment at least about 18 carbon atoms, in another embodiment at least about 20 carbon atoms, in yet another embodiment at least about 22 carbon atoms, in still another embodiment at least about 24 carbon atoms, in another embodiment at least about 26 carbon atoms, in yet another embodiment at least about 28 carbon atoms, in still another embodiment at least about 30 carbon atoms, in another embodiment at least about 32 carbon atoms, and in yet another embodiment at least about 34 carbon atoms, and in one embodiment with no more than about 80 carbon atoms, in another embodiment with no more than about 60 carbon atoms, and in yet another embodiment with no more than about 50 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 6 carbon atoms, in another embodiment with at least about 10 carbon atoms, in yet another embodiment with at least about 14 carbon atoms, in still another embodiment with at least about 16 carbon atoms, in another embodiment with at least about 18 carbon atoms, in yet another embodiment with at least about 20 carbon atoms, in still another embodiment with at least about 22 carbon atoms, in another embodiment with at least about 24 carbon atoms, in yet another embodiment with at least about 26 carbon atoms, in still another embodiment with at least about 28 carbon atoms, in another embodiment with at least about 30 carbon atoms, in yet another embodiment with at least about 32 carbon atoms, and in still another embodiment with at least about 34 carbon atoms, and in one embodiment with no more than about 80 carbon atoms, in another embodiment with no more than about 60 carbon atoms, and in yet another embodiment with no more than about 50 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 7 carbon atoms, in another embodiment with at least about 12 carbon atoms, in yet another embodiment with at least about 14 carbon atoms, in still another embodiment with at least about 16 carbon atoms, in another embodiment with at least about 18 carbon atoms, in yet another embodiment with at least about 20 carbon atoms, in still another embodiment with at least about 22 carbon atoms, in another embodiment with at least about 24 carbon atoms, in yet another embodiment with at least about 26 carbon atoms, in still another embodiment with at least about 28 carbon atoms, in another embodiment with at least about 30 carbon atoms, in yet another embodiment with at least about 32 carbon atoms, and in still another embodiment with at least about 34 carbon atoms, and in one embodiment with no more than about 80 carbon atoms, in another embodiment with no more than about 60 carbon atoms, and in yet another embodiment with no more than about 50 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 7 carbon atoms, in another embodiment with at least about 12 carbon atoms, in yet another embodiment with at least about 14 carbon atoms, in still another embodiment with at least about 16 carbon atoms, in another embodiment with at least about 18 carbon atoms, in yet another embodiment with at least about 20 carbon atoms, in still another embodiment with at least about 22 carbon atoms, in another embodiment with at least about 24 carbon atoms, in yet another embodiment with at least about 26 carbon atoms, in still another embodiment with at least about 28 carbon atoms, in another embodiment with at least about 30 carbon atoms, in yet another embodiment with at least about 32 carbon atoms, and in still another embodiment with at least about 34 carbon atoms, and in one embodiment with no more than about 80 carbon atoms, in another embodiment with no more than about 60 carbon atoms, and in yet another embodiment with no more than about 50 carbon atoms, although the number of carbon atoms can be outside of these ranges, such as tolylene or the like, $R_6$ and $R_7$ each, independently of the other, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group provided that no hetero atom is directly bonded to the carboxylic acid group), in one embodiment with at least 1 carbon atom, in another embodiment at least about 2 carbon atoms, in yet another embodiment at least about 3 carbon atoms, in still another embodiment at least about 4 carbon atoms, in another embodiment at least about 5 carbon atoms, in yet another embodiment at least about 6 carbon atoms, in still another embodiment at least about 7 carbon atoms, and in another embodiment at least about 8 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group provided that no hetero atom is directly bonded to the carboxylic acid group), in one embodiment with at least about 6 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group provided that no hetero atom is directly bonded to the carboxylic acid group), in one embodiment with at least about 7 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, such as tolyl or the like, $R_2$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group provided that no hetero atom is directly bonded to either of the carboxylic acid groups), having in one embodiment at least about 2 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group provided that no hetero atom is directly bonded to either of the carboxylic acid groups), in one embodiment with at least about 6 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group provided that no hetero atom is directly bonded to either of the carboxylic acid groups), in one embodiment with at least about 7 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group provided that no hetero atom is directly bonded to either of the carboxylic acid groups), in one embodiment with at least about 7 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, such as tolylene or the like, and $R_4$ and $R_5$ each, independently of the other, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group provided that no hetero atom is directly bonded to the carboxylic acid group), in one embodiment with at least 1 carbon atom, in another embodiment at least about 2 carbon atoms, in yet another embodiment at least about 3 carbon atoms, in still another embodiment at least about 4 carbon atoms, in another embodiment at least about 5 carbon atoms, in yet another embodiment at least about 6 carbon atoms, in still another embodiment at least about 7 carbon atoms, and in another embodiment at least about 8 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group provided that no hetero atom is directly bonded to the carboxylic acid group), in one embodiment with at least about 6 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group, in one embodiment with at least about 7 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group provided that no hetero atom is directly bonded to the carboxylic acid group), in one embodiment with at least about 7 carbon atoms, and in one embodiment with no more than about 100 carbon atoms, in another embodiment with no more than about 80 carbon atoms, in yet another embodiment with no more than about 60 carbon atoms, in still another embodiment with no more than about 50 carbon atoms, and in yet still another embodiment with no more than about 24 carbon atoms, although the number of carbon atoms can be outside of these ranges, such as tolyl or the like, wherein the substituents on the substituted alkyl, alkylene, aryl, arylene, arylalkyl, arylalkylene, alkylaryl, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

The di-, tri-, or polyacid, the monohydric alcohol, and the diamine generally are admixed and heated to effect the reaction. Examples of suitable reaction temperatures are in one embodiment at least about 120° C., in another embodiment at least about 150° C., and in yet another embodiment at least about 200° C., and in one embodiment no more than about 400° C., in another embodiment no more than about 350° C., and in yet another embodiment no more than about 300° C., although the temperature can be outside of these ranges.

Examples of suitable ester-amide compounds and the preparation thereof are disclosed in, for example, U.S. Pat. No. 5,863,319, U.S. Pat. No. 5,645,632, and U.S. Pat. No. 5,783,657, the disclosures of each of which are totally incorporated herein by reference. Suitable ester-amides are also commercially available as, for example, UNI-REZ® 2980 and UNICLEAR® 100 from Arizona Chemical, Savannah, Ga., and the like.

In one specific embodiment, the ester-amide compound has a melting point of at least about 50° C., although the melting point can be outside of this range. In one specific embodiment, the ester-amide compound has a melting point of no more than about 160° C., although the melting point can be outside of this range. In one specific embodiment, the ester-amide compound has a viscosity at about 140° C. of at least about 20 centipoise, although the viscosity can be outside of this range. In one specific embodiment, the ester-amide compound has a viscosity at about 140° C. of no more than about 400 centipoise, although the viscosity can be outside of this range.

The ester-amide is present in the ink carrier in any desired or effective amount, in one specific embodiment at least about 5 percent by weight, in another embodiment at least about 10 percent by weight, and in yet another embodiment at least about 13 percent by weight, and in one embodiment no more than about 32 percent by weight, in another embodiment no more than about 27 percent by weight, and in yet another embodiment no more than about 22 percent by weight, although the amount can be outside of these ranges.

The ink also contains a second component which comprises either (i) a material selected from the group consisting of urethane compounds, urea compounds, urethane-urea compounds, and mixtures thereof, (ii) a polyalkylene wax, or (iii) a mixture thereof. Isocyanate-derived resins and waxes, such as urethane isocyanate-derived materials, urea isocyanate-derived materials, urethane/urea isocyanate-derived materials, mixtures thereof, and the like, are suitable as second component materials. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

When the second component is one or more isocyanate-derived materials, the isocyanate-derived material(s) is present in the ink carrier in any desired or effective amount, in one embodiment at least about 8 percent by weight of the ink carrier, in another embodiment of at least about 11 percent by weight of the ink carrier, and in yet another embodiment of at least about 14.5 percent by weight of the ink carrier, and in one embodiment of no more than about 29 percent by weight of the ink carrier, in another embodiment of no more than about 24 percent by weight of the ink carrier, and in yet another embodiment of no more than about 19.5 percent by weight of the ink carrier, although the amount can be outside of these ranges. In one specific embodiment, the isocyanate-derived material is a mixture of a first urethane resin derived from the reaction of two equivalents of hydroabietyl alcohol and one equivalent of isophorone diisocyanate, present in the ink in an amount in one embodiment of at least about 6 percent by weight of the ink carrier, in another embodiment of at least about 8 percent by weight of the ink carrier, and in yet another embodiment of at least about 10 percent by weight of the ink carrier, and in one embodiment of no more than about 16 percent by weight of the ink carrier, in another embodiment of no more than about 14 percent by weight of the ink carrier, and in yet another embodiment of no more than about 12 percent by weight of the ink carrier, although the amount can be outside of these ranges, and a second urethane resin that is the adduct of three equivalents of stearyl isocyanate and a glycerol-based propoxylate alcohol, present in the ink in an amount in one embodiment of at least about 2 percent by weight of the ink carrier, in another embodiment of at least about 3 percent by weight of the ink carrier, and in yet another embodiment of at least about 4.5 percent by weight of the ink carrier, and in one embodiment of no more than about 13 percent by weight of the ink carrier, in another embodiment of no more than about 10 percent by weight of the ink carrier, and in yet another embodiment of no more than about 7.5 percent by weight of the ink carrier, although the amount can be outside of these ranges.

The second component can also be a polyalkylene wax, such as a polyethylene wax, a polypropylene wax, mixtures thereof, or the like. When the second component is one or more polyalkylene waxes, the polyalkylene wax(es) is present in the ink carrier in any desired or effective amount, in one embodiment at least about 25 percent by weight of the ink carrier, in another embodiment of at least about 30 percent by weight of the ink carrier, and in yet another embodiment of at least about 37 percent by weight of the ink carrier, and in one embodiment of no more than about 60 percent by weight of the ink carrier, in another embodiment of no more than about 53 percent by weight of the ink carrier, and in yet another embodiment of no more than about 48 percent by weight of the ink carrier, although the amount can be outside of these ranges.

The second component can also be a mixture of one or more isocyanate-derived materials and one or more polyalkylene waxes.

The ester-amide and the urethane, urea, urethane-urea, and/or polyalkylene wax can be admixed with other materials to create an ink carrier. Any desired or effective carrier composition can be used. Examples of suitable ink carrier materials include fatty amides, such as monoamides, tetraamides, mixtures thereof, and the like.

Suitable monoamides include both solid and liquid monoamides, provided that the ink containing the mixture of all ingredients is solid at room temperature (typically from about 20 to about 25° C.). In one specific embodiment, the monoamide has a melting point of at least about 50° C., although the melting point can be below this temperature. In another specific embodiment, the monoamide has a melting point of no more than about 100° C., although the melting point can be above this temperature. Some specific examples of suitable monoamides include (but are not limited to) primary monoamides and secondary monoamides. Stearamide, such as KEMAMIDE S available from Witco Chemical Company and CRODAMIDE S available from Croda, behenamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. In one specific embodiment, the monoamide is of the formula

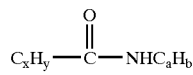

wherein x is an integer of from about 5 to about 21, y is an integer of from about 11 to about 43, a is an integer of from about 6 to about 22, and b is an integer of from about 13 to about 45. Mixtures of two or more monoamides can also be present in the ink.

The monoamide is present in the ink carrier in any desired or effective amount, in one specific embodiment at least about 8 percent by weight, in another embodiment at least about 10 percent by weight, and in yet another embodiment at least about 12 percent by weight, and in one embodiment no more than about 70 percent by weight, in another embodiment no more than about 60 percent by weight, in yet another embodiment no more than about 50 percent by weight, in still another embodiment no more than about 32 percent by weight, in another embodiment no more than about 28 percent by weight, and in yet another embodiment no more than about 25 percent by weight, although the amount can be outside of these ranges.

Suitable tetra-amides include both solid and liquid tetra-amides, provided that the ink containing the mixture of all ingredients is solid at room temperature (typically from about 20 to about 25° C.). One specific class of suitable tetra-amides is that encompassed by the formula

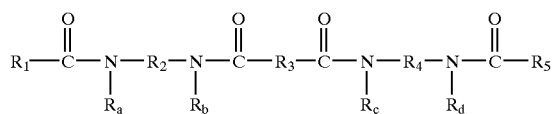

wherein $R_a$, $R_b$, $R_c$, and $R_d$ each, independently of the others, is (a) a hydrogen atom, (b) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 100 carbon atoms, and in another embodiment with no more than about 50 carbon atoms, although the number of carbon atoms can be outside of these ranges, (c) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 100 carbon atoms, and in another embodiment with no more than about 50 carbon atoms, although the number of carbon atoms can be outside of these ranges, (d) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 100 carbon atoms, and in another embodiment with no more than about 50 carbon atoms, although the number of carbon atoms can be outside of these ranges, such as benzyl or the like, or (e) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 100 carbon atoms, and in another embodiment with no more than about 50 carbon atoms, although the number of carbon atoms can be outside of these ranges, such as tolyl or the like, wherein $R_2$, $R_3$, and $R_4$ each, independently of the others, are (a) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, (b) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, (c) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, or (d) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, and wherein $R_1$ and $R_5$ each, independently of the other, is (a) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, in still another embodiment with at least about 8 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, (b) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, in another embodiment with at least about 6 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, (c) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, such as benzyl or the like, or (d) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, such as tolyl or the like, wherein the substituents on the substituted alkyl, aryl, arylalkyl, alkylaryl, alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylic acid groups, mixtures thereof, and the like, wherein two or more substituents can be joined together to form a ring. In one specific embodiment, one or both of $R_1$ and $R_5$ are alkyl groups with about 18 carbon atoms. In another specific embodiment, one or both of $R_1$ and $R_5$ are alkyl groups with at least about 37 carbon atoms. In yet another specific embodiment, one or both of $R_1$ and $R_5$ are alkyl groups with about 48 carbon atoms. In still another specific embodiment, $R_1$ and $R_5$ are both —(CH$_2$)$_{16}$CH$_3$, $R_2$ and $R_4$ are each —CH$_2$CH$_2$—, and $R_3$ is a branched unsubstituted alkyl group having about 34 carbon atoms. In another specific embodiment, $R_1$ and $R_5$ are both —(CH$_2$)$_n$CH$_3$ wherein n is 47 or 48, $R_2$ and $R_4$ are each —CH$_2$CH$_2$—, and $R_3$ is a branched unsubstituted alkyl group having about 34 carbon atoms.

Tetra-amides can be prepared as disclosed in, for example, U.S. Pat. No. 6,174,937, the disclosure of which is totally incorporated herein by reference. One specific example of a suitable tetra-amide is a tetra-amide resin obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference.

Mixtures of fatty amide materials can also be employed as additional ink carrier compositions for the inks prepared as disclosed herein.

Additional suitable phase change ink carrier materials for the inks prepared as disclosed herein include paraffins, microcrystalline waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with an ester-amide material, fatty amide material, and/or an isocyanate-derived material.

The ink carriers can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink carrier, in another embodiment of at least about 0.1 percent by weight of the ink carrier, and in yet another embodiment of at least about 1 percent by weight of the ink carrier, and in one embodiment of no more than about 20 percent by weight of the ink carrier, in another embodiment of no more than about 5 percent by weight of the ink carrier, and in yet another embodiment of no more than about 3 percent by weight of the ink carrier, although the amount can be outside of these ranges.

The ink carriers can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink carrier, in another embodiment of at least about 1 percent by weight of the ink carrier, and in yet another embodiment of at least about 10 percent by weight of the ink carrier, and in one embodiment of no more than about 99 percent by weight of the ink carrier, in another embodiment of no more than about 30 percent by weight of the ink carrier, and in yet another embodiment of no more than about 15 percent by weight of the ink carrier, although the amount can be outside of these ranges.

Other optional additives to the ink carriers include clarifiers, such as UNION CAMP® X37-523-235 (commercially available from Union Camp), in one embodiment in an amount in one embodiment of at least about 0.01 percent by weight of the ink carrier, in another embodiment of at least about 0.1 percent by weight of the ink carrier, and in yet another embodiment of at least about 5 percent by weight of the ink carrier, and in one embodiment of no more than about 98 percent by weight of the ink carrier, in another embodiment of no more than about 50 percent by weight of the ink carrier, and in yet another embodiment of no more than about 10 percent by weight of the ink carrier, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVRAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink carrier, in another embodiment of at least about 5 percent by weight of the ink carrier, and in yet another embodiment of at least about 10 percent by weight of the ink carrier, and in one embodiment of no more than about 98 percent by weight of the ink carrier, in another embodiment of no more than about 75 percent by weight of the ink carrier, and in yet another embodiment of no more than about 50 percent by weight of the ink carrier, although the amount can be outside of these range, adhesives, such as VERSAMID® 757, 759, or 744 (commercially available from Henkel), in an amount in one embodiment of at least about 0.1 percent by weight of the ink carrier, in another embodiment of at least about 1 percent by weight of the ink carrier, and in yet another embodiment of at least about 5 percent by weight of the ink carrier, and in one embodiment of no more than about 98 percent by weight of the ink carrier, in another embodiment of no more than about 50 percent by weight of the ink carrier, and in yet another embodiment of no more than about 10 percent by weight of the ink carrier, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink carrier, in another embodiment of at least about 1 percent by weight of the ink carrier, and in yet another embodiment of at least about 2 percent by weight of the ink carrier, and in one embodiment of no more than about 50 percent by weight of the ink carrier, in another embodiment of no more than about 30 percent by weight of the ink carrier, and in yet another embodiment of no more than about 10 percent by weight of the ink carrier, although the amount can be outside of these ranges, and the like.

The ink carrier is present in the phase change ink prepared as disclosed herein in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change ink compositions also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (iCI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 26050) (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange Oreg. 2673 (Paul Uhlich); Paliogen Yellow 152, 1560 (BASF); Lithol Fast Yellow 0991 K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Also suitable are the colorants disclosed in U.S. Pat. No. 6,472,523, Copending Application U.S. Ser. No. 10/072, 210, filed Feb. 8, 2002, entitled "Ink Compositions Containing Phthalocyanines," U.S. Pat. No. 6,476,219, U.S. Pat. No. 6,576,747, Copending Application U.S. Ser. No. 10/185, 994, filed Jun. 27, 2002, entitled "Dimeric Azo Pyridone Colorants," Copending Application U.S. Ser. No. 10/184, 269, filed Jun. 27, 2002, entitled "Phase Change Inks Containing Dimeric Azo Pyridone Colorants," Copending Application U.S. Ser. No. 10/185,264, filed Jun. 27, 2002, entitled "Phase Change Inks Containing Azo Pyridone Colorants," U.S. Pat. No. 6,590,082, Copending Application U.S. Ser. No. 10/185,597, filed Jun. 27, 2002, entitled "Process for Preparing Substituted Pyridone Compounds," U.S. Pat. No. 6,576,748, Copending Application U.S. Ser. No. 10/186, 023, filed Jun. 27, 2002, entitled "Dimeric Azo Pyridone Colorants," Copending Application U.S. Ser. No. 10/184, 266, filed Jun. 27, 2002, entitled "Phase Change Inks Containing Dimeric Azo Pyridone Colorants," Copending Application U.S. Ser. No. 10/260,146, filed Sep. 27, 2002, entitled "Colorant Compounds," and Copending Application U.S. Ser. No. 10/260,379, filed Sep. 27, 2002, entitled "Methods for Making Colorant Compounds," the disclosures of each of which are totally incorporated herein by reference.

Other ink colors besides the subtractive primary colors can be desirable for applications such as postal marking, industrial marking, and labelling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

In a specific embodiment, the colorant is an isocyanate-derived colored resin as disclosed in, for example, U.S. Pat. No. 5,780,528 and U.S. Pat. No. 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. No. 3,157,633, U.S. Pat. No. 3,927,044, U.S. Pat. No. 3,994,835, U.S. Pat. No. 4,102,644, U.S. Pat. No. 4,113,721, U.S. Pat. No. 4,132,840, U.S. Pat. No. 4,137,243, U.S. Pat. No. 4,170,564, U.S. Pat. No. 4,284,729, U.S. Pat. No. 4,507,407, U.S. Pat. No. 4,640,690, U.S. Pat. No. 4,732,570, U.S. Pat. No. 4,751,254, U.S. Pat. No. 4,751,254, U.S. Pat. No. 4,761,502, U.S. Pat. No. 4,775,748, U.S. Pat. No. 4,812,141, U.S. Pat. No. 4,846,846, U.S. Pat. No. 4,871,371, U.S. Pat. No. 4,912,203, U.S. Pat. No. 4,978,362, U.S. Pat. No. 5,043,013, U.S. Pat. No. 5,059,244, U.S. Pat. No. 5,149,800, U.S. Pat. No. 5,177,200, U.S. Pat. No. 5,270,363, U.S. Pat. No. 5,290,921, and U.S. Pat. No. 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used.

The colorant is present in the phase change ink in any desired or effective amount to obtain the desired color or hue, typically at least about 0.1 percent by weight of the ink, preferably at least about 0.2 percent by weight of the ink, and more preferably at least about 0.5 percent by weight of the ink, and typically no more than about 50 percent by weight of the ink, preferably no more than about 20 percent by weight of the ink, and more preferably no more than about 10 percent by weight of the ink, although the amount can be outside of these ranges.

The ink compositions disclosed herein in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions prepared by the process disclosed herein generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

A cyan phase change ink was prepared by combining in a 2,000 milliliter stainless steel beaker 302.25 grams of POLYWAX PE655 (polyethylene wax, obtained from Baker-Petrolite Co., Tulsa, Okla., of the formula $CH_3(CH_2)_{50}CH_3$), 26.00 grams of stearyl stearamide wax (KEMAMIDE® S-180, obtained from Crompton Corporation, Greenwich, Conn.), 201.50 grams of ester-terminated di-, tri-, and/or polyamide (UNI-REZ® 2980, obtained from Arizona Chemical, Savannah, Ga.), 76.70 grams of a urethane resin ("resin 1") obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 32.50 grams of a urethane resin ("resin 2") that was the adduct of three equivalents of stearyl isocyanate and a glycerol-based alcohol, prepared as described in Example 4 of U.S. Pat. No. 6,309,453, the disclosure of which is totally incorporated herein by reference, and 1.30 grams of NAUGUARD® 445 antioxidant (obtained from Uniroyal Chemical Co., Middlebury, Conn.). The ingredients were melted together at a temperature of about 135° C. in an oven, and were then blended by stirring in a temperature controlled mantle for 0.5 hour at 135° C. Thereafter, 39.00 grams of a cyan-colored wax prepared as disclosed in Example 4 of U.S. Pat. No. 5,919,839, the disclosure of which is totally incorporated herein by reference was added to the mixture and the mixture was stirred for an additional 2 hours. Subsequently, 0.5 part per hundred by weight of the ink of HYFLO SUPERCEL filter aid (obtained from Fluka Chemical) was added and stirred into the molten ink for 5 minutes. The ink was then filtered through a heated (135° C.) MOTTO apparatus (obtained from Mott Metallurgical) using Whatman # 3 filter paper at 15 psi. The filtered ink was poured into molds and allowed to solidify to form ink sticks.

EXAMPLE II

The process of Example I was repeated with different amounts and a different colorant, as follows, to prepare a black phase change ink:

| Ingredient | Amount (grams) |
| --- | --- |
| POLYWAX PE655 | 369.10 |
| KEMAMIDE ® S-180 | 86.70 |
| UNI-REZ ® 2980 | 290.56 |
| resin 1 | 67.60 |

-continued

| Ingredient | Amount (grams) |
|---|---|
| resin 2 | 48.10 |
| NAUGUARD ® 445 | 1.30 |
| black dye* | 23.59 |
| orange dye** | 1.86 |

*SAVINYL BLACK NS, solvent soluble black dye obtained from Clariant Corp., Coventry, RI
**MACROLEX ORANGE R, orange dye, obtained from Bayer Corporation, Pittsburgh, PA

EXAMPLE III

The process of Example I was repeated with different amounts and a different colorant, as follows, to prepare a yellow phase change ink:

| Ingredient | Amount (grams) |
|---|---|
| POLYWAX PE655 | 325.00 |
| UNI-REZ ® 2980 | 214.50 |
| resin 1 | 65.00 |
| resin 2 | 29.25 |
| NAUGUARD ® 445 | 1.30 |
| yellow dye* | 2.30 |

*NEOPEN YELLOW 075, yellow dye obtained from BASF Corporation, Mount Olive, NJ

EXAMPLE IV

The process of Example I was repeated with different amounts and a different colorant as follows, to prepare a magenta phase change ink:

| Ingredient | Amount (grams) |
|---|---|
| POLYWAX PE655 | 314.74 |
| UNI-REZ ® 2980 | 224.58 |
| resin 1 | 64.17 |
| resin 2 | 32.08 |
| NAUGUARD ® 445 | 1.28 |
| magenta dye 1* | 5.85 |
| magenta dye 2** | 2.44 |
| DDBSA*** | 4.88 |

*UNIGRAPH RED 1900, magenta dye obtained from United Color Manufacturing, Inc., Newtown, PA
**NEPTUN RED BASE NB 543, red dye obtained from BASF Corporation, Mount Olive, NJ
***dodecylbenzene sulfonic acid, BIO-SOFT ® S-100, obtained from Stepan Chemical Co., Northfield, IL

EXAMPLE V

The process of Example I was repeated with different amounts and a different colorant, as follows, to prepare a yellow phase change ink:

| Ingredient | Amount (grams) |
|---|---|
| POLYWAX PE655 | 248.50 |
| KEMAMIDE ® S-180 | 129.50 |
| UNI-REZ ® 2980 | 231.00 |
| resin 1 | 70.00 |

-continued

| Ingredient | Amount (grams) |
|---|---|
| resin 2 | 31.50 |
| NAUGUARD ® 445 | 1.40 |
| yellow dye* | 16.10 |

*NEOPEN YELLOW 075, yellow dye obtained from BASF Corporation, Mount Olive, NJ

EXAMPLE VI

The process of Example I was repeated with different amounts and a different colorant, as follows, to prepare a magenta phase change ink:

| Ingredient | Amount (grams) |
|---|---|
| POLYWAX PE655 | 249.20 |
| KEMAMIDE ® S-180 | 95.90 |
| UNI-REZ ® 2980 | 241.50 |
| resin 1 | 68.46 |
| resin 2 | 29.37 |
| NAUGUARD ® 445 | 1.40 |
| magenta dye 1* | 6.30 |
| magenta dye 2** | 2.63 |
| DDBSA*** | 5.25 |

*KEYPLAST MAGENTA RB magenta dye, obtained from Keystone Aniline Corp., Chicago, IL
**NEPTUN RED BASE NB 543, red dye obtained from BASF Corporation, Mount Olive, NJ
***dodecylbenzene sulfonic acid, BIO-SOFT ® S-100, obtained from Stepan Chemical Co., Northfield, IL

EXAMPLE VII

The process of Example I was repeated with different amounts and a different colorant, as follows, to prepare a cyan phase change ink:

| Ingredient | Amount (grams) |
|---|---|
| POLYWAX PE655 | 287.25 |
| KEMAMIDE ® S-180 | 72.75 |
| UNI-REZ ® 2980 | 221.25 |
| resin 1 | 84.00 |
| resin 2 | 36.75 |
| NAUGUARD ® 445 | 1.50 |
| cyan dye* | 46.50 |

*cyan wax prepared as described in Example 4 of U.S. Pat. No. 5,919,839

EXAMPLE VIII

The properties of the inks prepared in Examples I through VII were determined. Viscosity ($\eta$, centipoise) was measured at 135° C. with a Rheometric Scientific RS-2000 cone-plate viscometer. Melting point (mp, ° C.) was measured by differential scanning calorimetry using a DUPONT 2100 calorimeter. Glass transition temperature ($T_g$) was measured by dynamic mechanical analysis using a Rheometric Scientific RSA 11 Solids Analyzer. Spectral strength (SS) was determined in butanol using a Perkin-Elmer Lambda 2S UV/VIS spectrophotometer. The inks were each incorporated into a XEROX® PHASER® 840 printer, which uses a process wherein the ink is jetted in an imagewise pattern onto an intermediate transfer member and subsequently transferred from the intermediate transfer member to a substrate, and used to generate prints, all of which were of good image quality.

| Ink | η | mp | $T_g$ | SS |
|---|---|---|---|---|
| I | 11.95 | 90.21, 73.76 | 8.77 | 1498 |
| II | 11.62 | 90.32, 79.83 | 8.69 | 685 |
| III | 11.79 | 91 | 11.56 | 1868 |
| IV | 12.07 | 91.02 | 12.58 | 820 |
| V | 11.67 | 81.83, 89.59 | 6.46 | 1582 |
| VI | 11.79 | 82.08, 89.82 | 7.31 | 826 |
| VII | 11.84 | 90.26, 79.82 | 6.87 | 1583 |

EXAMPLE IX

Polyethylene wax enables phase change inks to exhibit a desirably low coefficient of friction, thereby enhancing performance of documents printed with these inks when circulated through automatic document feeders. The miscibility of polyethylene wax (POLYWAX PE655, obtained from Baker-Petrolite Co., Tulsa, Okla.) with an ester-terminated di-, tri-, and/or polyamide (UNI-REZ® 2980, obtained from Arizona Chemical, Savannah, Ga.) at various ratios was determined and compared with the miscibility of the same polyethylene wax with a dimer acid based tetra-amide that is the reaction product of dimer acid, ethylene diamine, and stearic acid (UNI-REZ® 2970, obtained from Arizona Chemical, Savannah, Ga.). The mixtures of polyethylene wax and resin were melted and mixed in glass jars at 135° C. at the weight ratios indicated (resin:wax) in the table below and their miscibility was checked with the naked eye according to cloudiness and phase separation. The results were as follows:

| resin:wax weight ratio | 10:90 | 20:80 | 30:70 | 40:60 | 50:50 |
|---|---|---|---|---|---|
| ester-terminated polyamide | yes | yes | yes | yes | yes |
| tetra-amide | no | no | no | no | no |

As the results indicate, the ester-terminated polyamide was miscible with the polyethylene wax at a wide range of weight ratios, whereas the tetra-amide resin was not. This wide range of miscibilities allows wide latitude in the preparation of phase change inks containing polyethylene wax with the ester-terminated polyamide, thereby enabling preparation of phase change inks having desirably low coefficient of friction in addition to other desirable ink characteristics.

What is claimed is:

1. A phase change ink composition comprising (1) an ink carrier comprising (A) a first component which comprises an ester-amide material, and (B) a second component which comprises a material selected from the group consisting of (a) a mixture of a first urethane resin derived from the reaction of two equivalents of hydroabietyl alcohol and one equivalent of isophorone diisocyanate and a second urethane resin that is the adduct of three equivalents of stearyl isocyanate and a glycerol-based propoxylate alcohol, (b) urea compounds, (c) urethane-urea compounds, and mixtures thereof; and (2) a colorant.

2. An ink according to claim 1 wherein the second component comprises a material selected from the group consisting of (a) a mixture of a first urethane resin derived from the reaction of two equivalents of hydroabietyl alcohol and one equivalent of isophorone diisocyanate and a second urethane resin that is the adduct of three equivalents of stearyl isocyonate and a qlycerol-based propoxylate alcohol, (b) urea compounds, (c) urethane-urea compounds, and (d) mixtures thereof.

3. An ink according to claim 2 wherein the second material is present in the ink carrier in an amount of at least about 8 percent by weight of the ink carrier, and wherein the second material is present in the ink carrier in an amount of no more than about 29 percent by weight of the ink carrier.

4. An ink according to claim 2 wherein the second component comprises a mixture of a first urethane resin derived from the reaction of two equivalents of hydroabietyl alcohol and one equivalent of isophorone diisocyanate and a second urethane resin that is the adduct of three equivalents of stearyl isocycanate and a glycerol-based propoxylate alcohol.

5. An ink according to claim 1 further comprising a polyalkylene wax.

6. An ink according to claim 5 wherein the polyalkylene wax is present in the ink carrier in an amount of at least about 25 percent by weight of the ink carrier, and wherein the polyalkylene wax is present in the ink carrier in an amount of no more than about 60 percent by weight of the ink carrier.

7. An ink according to claim 5 wherein the polyalkylene wax is a polyethylene wax.

8. An ink according to claim 1 further comprising a monoamide.

9. An ink according to claim 8 wherein the monoamide is present In the ink carrier in an amount of at least about 8 percent by weight and wherein the monoamide is present in the ink carrier in an amount of no more than about 70 percent by weight.

10. An ink according to claim 1 wherein the ester-amide material is present in the ink carrier in an amount of at least about 5 percent by weight.

11. An ink according to claim 1 wherein the ester-amide material is present in the ink carrier in an amount of no more than about 32 percent by weight.

12. A phase change ink composition comprising (1) an ink carrier comprising (A) a first component which comprises an ester-amide material which is the reaction product of (a) a diacid, triacid, or polyacid, (b) a monohydric alcohol, and (c) a diamine, and (B) a second component which comprises a material selected from the group consisting of (a) mixture of a first urethane resin derived from the reaction of two equivalents of hydroabietyl alcohol and one equivalent of isophorone diisocyanate and a second urethane resin that is the adduct of three equivalents of stearyl isocyanate and a glycerol-based propoxylate alcohol, (b) urea compounds, (c) urethane-urea compounds, and (d) mixtures thereof; and (2) a colorant.

13. An ink according to claim 12 wherein the diacid, triacid, or polyacid is a diacid of the formula

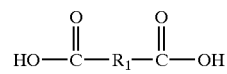

wherein $R_1$ is (i) an alkylene group, (ii) an arylene group, (iii) an arylalkylene group, or (iv) an alkylarylene group, the monohydric alcohol is of the formula $$R_2-OH$$

wherein $R_2$ is (I) on alkyl group, (ii) an aryl group, (iii) an arylalkyl group, or (iv) an alkylaryl group, and the diamine is of the formula $$A_1-R_3-A_2$$

wherein $A_1$ and $A_2$ each, independently of the other, is a primary or secondary amino group and $R_5$ is (i) an alkylene group, (ii) an arylene group, (iii) an arylalkylene group, or (iv) on alkylarylene group.

14. An ink according to claim 13 wherein the diacid is malonic acid, methyl malonic acid, ethyl malonic acid, butyl malonic acid, dimethyl malonic acid, diethyl malonic acid, succinic acid, methyl succinic acid, dimethyl succinic acid, 2-ethyl-2-methyl succinic acid, 2,3-dimethyl succinic acid, glutaric acid, 2-methyl glutaric acid, 3-methyl glutaric acid, 2,2-dimethyl glutaric acid, 3,3-dimethyl glutaric acid, adipic acid, 3-methyl adipic acid, 3-tert-butyl adipic acid, pimelic acid, suberic acid, azeloic acid, sebacic acid, 1,11-undecanedicarboxylic acid, undeconedioic acid, 1,10-decanedicarboxylic acid, 1,12-dodecanedicarboxylic acid, hexadecanedioic acid, docosonedioic acid, tetracosanedioic acid, itaconic acid, maleic acid, fumaric acid, citraconic acid, mesaconic acid, glutaconic acid, β-hydromuconic acid, traumatic acid, muconic acid, aconitic acid, chlorosuccinic acid, bromosuccinic acid, 2,3-dibromosuccinic acid, tetrafluorosuccinic acid, hexafluoroglutaric acid, perfluoroadipic acid, perfluorosuberic acid, 3-chlorododeconedioic acid, dibromomaleic acid, diglycolic acid, 3,6-dioxaoctanedioic acid, thiodiglycolic acid, 3,3'-thiodipropionic acid, 1,3-acetonedilcarboxylic acid, 3-oxoadipic acid, 4-ketopimelic acid, 5-oxoazelaic acid, chelidonic acid, 1,2-cyclopentanedicarboxylic acid, 3,3-tetramethyleneglutaric acid, camphoric acid, cyclohexylsuccinic acid, 1,1-cyclohexanediacetic acid, 1,2-cyclohexonedicarboxylic acid, 1,3-cyclohexanedicarboxylic acid, 1,4-cyclohexanedicarboxylic acid, 1,3-adamantanedicarboxylic acid, 1,3-adamantanediocetic acid, 5-norbornene-2,3-dicarboxylic acid, 1,4,5,6,7,7-hexachloro-5-norbornene-2,3-dicarboxylic acid, phenylsuccinic acid, 3-phenylglutaric acid, 1,2-phenylenediacetic acid, 1,2-phenylenedioxydiacetic acid, homophthalic acid, 1,3-phenylenediacetic acid, 4-carboxyphenoxyacetic acid, 1,4-phenylenediacetic acid, 1,4-phenylenedipropionic acid, 2-carboxycinnamic acid, 1,4-phenylenediacrylic acid, 2-carboxybenzeneproponoic acid, 4,4'-(hexafluoroisopropylidene)bis(benzoic acid), 4,4'-oxybis(benzoic acid), phthalic acid, isophthalic acid, terephtholic acid, 3-fluorophthalic acid, 2-methoxyisophthalic acid, 3-nitrophathalic acid, 4-methylphtholic acid, 2-bromoterephtholic acid, 4-bromoisophthalic acid, 4-nitrophthalic acid, nitroterephthalic acid, 5-tert-butylisophthalic acid, 5-octadecyloxyisophthalic acid, 5-nitroisophthalic acid, 4,5-dichlorophtholic acid, tetrafluoroterephthalic acid, tetrafluoroisophthalic acid, tetrafluorophthalic acid, diphenic acid, 4,4'-biphenyldicarboxylic acid, 4-(4-(2-carboxybenzoyl)phenyl)butyric acid, 1,4-naphtholenedicarboxylic acid, 2,3-naphthalenedicarboxylic acid, 2,6-naphthalenedicarboxylic acid, 2,7-di-tert-butyl-9,9-dimethyl-4,5-xanthenedicorboxylic acid, phenylmalonic acid, benzylmalonic acid, a dimer acid of the formula

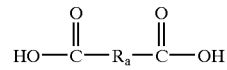

wherein $R_a$ is a branched alkylene group having about 34 carbon atoms and which may include unsaturations and cyclic groups, or mixtures thereof, the monohydric alcohol is methanol, ethanol, 1-propanol, 1-butanol, 1-pentanol, 1-hexanol, 1-heptanol, 1-octanol, 1-nonanol, 1-decanol, 1-undecanol, 1-dodecanol, 1-tridecanol, 1-tetradecanol, 1-pentadecanol, 1-hexodeconol, 1-heptadecanol, 1-octadecanol, 1-nonadecanol, 1-eicosanol, 1-docosanol, 1-hexocosonol, 1-triocontanol, 2-methyl-1-propanol, neopentyl alcohol, 2-methyl-1-butanol, 3-methyl-1-butanol, 2-ethyl-1-butanol, 3,3-dimethyl-1-butonol, 2-methyl-1-pentanol, 3-methyl-1-pentonol, 4-methyl-1-pentanol, 2-propyl-1-pentanol, 2,4,4-tri methyl-1-pentanol, 2-ethyl-1-hexanol, 3,5,5-trimethyl-1-hexanol, 3,7-dimethyl-1-octanol, 2-propanol, 2-butanol, 2-pentonol, 3-pentanol, 2-hexanol, 3-hexanol, 2-heptanol, 3-heptanol, 2-octanol, 3-octanol, 2-nonanol, 2-decanol, 4-decanol, 2-undecanol, 2-dodecanol, 2-tetradeconol, 2-hexadecanol, 3-methyl-2-butanol, 3,3-dimethyl-2-butanol, 3-methyl-2-pentanol, 4-methyl-2-pentanol, 2-methyl-3-pentanol, 4,4-dimethyl-2-pentanol, 2,2-dimethyl-3-pentanol, 2,4-dimethyl-3-pentanol, 5-methyl-2-hexanol, 2-methyl-3-hexanol, 6-methyl-2-heptanol, 4-methyl-3-heptanol, 2,6-dimethyl-4-heptanol, 2-methyl-2-propanol, tert-amyl alcohol, 2,3-dimethyl-2-butanol, 2-methyl-2-pentanol, 3-methyl-3-pentanol, 3-ethyl-3-pentanol, 2,3-dimethyl-3-pentanol, 3-ethyl-2,2-dimethyl-3-pentonol, 2-methyl-2-hexanol, 3,7-dimethyl-3-octanol, allyl alcohol, 2-methyl-2-propen-1-ol, crotyl alcohol, 3-buten-1-ol, 3-buten-2-ol, 3-methyl-2-buten-1-ol, 2-methyl-3-buten-1-ol, 3-methyl-3-buten-1-ol, 2-methyl-3-buten-2-ol, 2-penten-1-ol, 4-penten-1-ol, 3-penten-2-ol, 4-penten-2-ol, 1-penten-3-ol, 4-methyl-3-penten-1-ol, 3-methyl-1-penten-3-ol, 2-hexen-1-ol, 3-hexen-1-ol, 4-hexen-1-ol, 5-hexen-1-ol, 1-hexen-3-ol, 1-hepten-3-ol, 6-methyl-5-hepten-2-ol, 1-octen-3-ol, beta-citronellol, dihydromyrcenol, 3-nonen-1-ol, 5-decen-1-ol, 9-decen-1-ol, omega-undecylenyl alcohol, 7-dodecen-1-ol, 7-tetradecen-1-ol, 9-tetradecen-1-ol, 11-tetradecen-1-ol, 11-hexadecen-1-ol, phytol, oleyl alcohol, 1,4-pentodien-3-ol, 2,4-hexadien-1-ol, 1,5-hexadien-3-ol, 1,6-heptadien-4-ol, 2,4-dimethyl-2-heptadien-1-ol, nerol, geroniol, linalool, 8,10-dodecadien-1-ol, farnesol, cyclopropanemethanol, alpha-methylcyclopropanemethanol, 1-methylcyclopropanemethanol, 2-methylcyclopropanemethanol, cyclobutanol, cyclobutanemethanol, cyclopentanol, cyclopentanemethanol, 3-cyclopentyl-1-propanol, 1-methylcyclopentanol, 2-methylcyclopentanol, 3-methylcyclopentanol, cyclohexanol, cyclohexylmethanol, dicyclohexylmethanol, tricyclohexylmethanol, 2-cyclohexylethonol, 1-cyclohexylethanol, 3-cyclohexyl-1-propanot, 4-cyclohexyl-1-butanol, 1-methylcyclohexanol, 2-methylcyclohexanol, 2-ethylcyclohexanol, 2-tert-butylcyclohexanol, 3-methylcyclohexanol, 4-methylcyclohexanol, 4-ethylcyclohexanol, 4-tert-butylcyclohexanol, 4-tert-amylcyclohexanol, 2,3-dimethylcyclohexanol, menthol, 2,6-dimethylcyclohexanol, 3,5-dimethylcyclohexanol, 3,3,5,5-tetramethylcyclohexanol, cycloheptanol, cycloheptonemethanol, cyclooctanol, cyclododecanol, cyclododecanemethanol, norborneol, 2-norbornanemethanol, 3-methyl-2-norbornonemethonol, fenchyl alcohol, borneol, myrtanol, isopinocampheol, 4-pentylbicyclo(2.2.2)octan-ol, decahydro-1-naphthol, decahydro-2-naphthol, 1-adamantanol, 2-adamantanol, 1-adamantanemethanol, 1-adamantoneethanol, chrysanthemyl alcohol, 2-cyclohexen-1-ol, 3-cyclohexene-1-methanol, 3-methyl-2-cyclohexen-1-ol, 6-methyl-3-cyclohexene-1-methanol, p-menth-1-en-9-ol, alpha-terpineol, terpine-4-ol, dihydrocarveol, isopulegol, 3,5,5-trimethyl-2-cyclohexen-1-ol, perillyl alcohol, carveol, retinol, sclareol, 5-norbornen-2-ol, 5-norbornene-2-methanol, myrtenol, nopol, verbenol, ergocalciferol, 2-fluoroethanol, 2-chloroethanol, 2-bromoethanol, 2-iodoethanol, 2-chloro-1-propanol, 3-chloro-1-propanol, 3-bromo-1-propanol, 3-bromo-2-methyl-1-propanol, 3-chloro-2,2-dimethyl-1-propanol, 3-bromo-2,2-dimethyl-1-propanol, 4-chloro-1-butanol, 6-chloro-1-hexanol, 6-bromo-1-hexanol, 7-bromo-1-heptanol, 8-chloro-1-octanol, 8-bromo-1-octanol, 9-bromo-1-nonanol, 10-chloro-1-decanol, 10-bromo-1-decanol, 11-bromo-1-undecanol, 12-bromo-1-dodecanol, 2,2-dichloroethanol, 2,3-dibromopropanol, 2,2-bis(chloromethyl)-1-propanol, 2,2,2-trifluoroethanol, 2,2,2-trichloroethanol, 2,2,2-tribromoethanol, 2,2,3,3-tetrafluoro-1-propanol, 2,2,3,3,3-pentafluoro-1-propanol, 2,2,3,4,4,4-hexafluoro-1-butanol, 2,2,3,3,4,4,4-heptafluoro-1-butanol, 2,2,3,3,4,4,5,5-octafluoro-1-pentanol, 3,3,4,4,5,5,6,6,7,7,8,8,8-tridecafluoro-1-octanol, 2,2,3,3,4,4,5,5,6,6,7,7,8,8,8-pentadecafluoro-1-octanol, 1-chloro-2-propanol, 1-bromo-2-propanol, 1,3-difluoro-2-propanol, 1,3-dichloro-2-propanol, 1,3-dibromo-2-propanol, 1,4-dibromo-2-butanol, 1,1,1,3,3,3-hexafluoro-2-propanol, 1,1,1,3,3,4,4,4-octafluoro-2-butanol, 1-chloro-2-methyl-2-propanol, 1,1-trichloro-2-methyl-2-propanol, perfluoro-tert-butyl alcohol, 2-chloro-2-propen-1-ol, 3-bromo-3-buten-1-ol; 2-chlorocyclohexanol, phenol, o-cresol, 2-ethylphenol, 2-propylphenol, 2-isopropylphenol, 2-sec-butylphenol, 2-tert-butylphenol, 2-allylphenol, 2-propenylphenol, 2-cyclopentylphenol, 2-fluorophenol, alpha,alpha,alpha-trifluoro-o-cresol, 2-chlorophenol, 2-bromophenol, 2-iodophenol, guaiacol, 2-ethoxyphenol, 2-isopropoxyphenol, m-cresol, 3-ethyl phenol, 3-isopropylphenol, 3-tert-butylphenol, 3-pentadecylphenol, alpho,alpha,alpha-trifluoro-m-cresol, 3-fluorophenol, 3-chlorophenol, 3-bromophenol, 3-iodophenol, 3-methoxyphenol, 3-(trifluoromethoxy)phenol, p-cresol, 4-ethylphenol, 4-propylphenol, 4-isoprophylphenol, 4-sec-butylphenol, 4-tert-butylphenol, 4-tert-amylphenol, 4-octylphenol, 4-tert-octylphenol, nonylphenol, 4-cyclopentylphenol, 4-(1-adamantyl)phenol, alpho,alpho, alpha-trifluoro-p-cresol, 4-fluorophenol, 4-chlorophenol, 4-bromophenol, 4-iodophenol, 4-methoxyphenol, 4-(trifluoromethoxy)phenol, 4-ethoxyphenol, 4-propoxyphenol, 4-butoxyphenol, 4-hexyloxyphenol, 4-heptyloxyphenol, 2,3-dimethylphenol, 5,6,7,8-tetrahydro-1-nophthol, 2,3-dichlorophenol, 2,3-dlhydro-2,2-dimethyl-7-benzofuranol, 2,3-dimethoxyphenol, 2,6-dimethoxyphenol, 2,6-diisopropylphenol, di-sec-butylphenol, 2-tert-butyl-methylphenol, 2,6-di-tert-butylphenol, 2-allyl-6-methylphenol, 2,6-difluorophenol, 2,3-difluorophenol, 2,6-dlchlorophenol, 2,6-dibromophenol, 2-fluoro-6-methoxyphenol, 2,6-dimethoxyphenol, 3,5-dimethylphenol, 5-isopropyl-3-methylphenol, 3,5-di-tert-butylphenol, 3,5-bis(trifluoromethyl)phenol, 3,5-trifluorophenol, 3,5-trichlorophenol, 3,5-dimethoxyphenol, 3-chloro-5-methoxyphenol, 3,4-dimethylphenol, 5-indanol, 5,6,7,8-tetrahydro-2-naphthol, 4-chloro-3-methylphenol, 2,4-dimethylphenol, 2,5-dimethylphenol, thymol, 4-isopropyl-3-methylphenol, carvacrol, 2-tert-butyl-5-methylphenol, 2-tert-butyl-4-methylphenol, 2,4-di-tert-butylphenol, 2,4-di-tert-amylphenol, 2,4-bis(alpha,alpha dimethylbenzyl)phenol, 2-(1-adamantyl)-4-methyl phenol, 4-fluoro-2-methylphenol, 4-fluoro-3-methylphenol, 2-chloro-4-methylphenol, 2-chloro-5-methylphenol, 4-chloro-2-methylphenol, 4-chloro-3-ethylphenol, 2-bromo-4-methylphenol, 4-bromo-3-methylphenol, 4-iodo-2-methylphenol, 2-fluoro-3-(trifluoromethyl)phenol, 2-chloro-3-(trifluoromethyl)phenol, 2-chloro-5-(trifluoromethyl) phenol, 2,4-difluorophenol, 2-difluorophenol, 3,4-difluorophenol, 4-chloro-2-fluorophenol, 3-chloro-4-fluorophenol, 4-chloro-3-fluorophenol, 2-bromo-4-fluorophenol, 4-bromo-2-fluorophenol, 2-bromofluorophenol, 2,4-dichlorophenol, 3,4-dichlorophenol, 2,5-dichlorophenol, 2-bromo-4-chlorophenol, 2-chloro-4-fluorophenol, 4-bromo-2-chlorophenol, 2,4-dibromophenol, 2-methoxy-4-methylphenol, 4-chloro-2-methoxyphenol, 2-chloro-4-methoxyphenol, eugenol, oeugenol, 2-ethoxy-5-(propenyl)phenol, isoeugenol, 3,4-dimethoxyphenol, 4-allyl-2,6-dlmethoxyphenol, sesamol, 2,3,6-trimethylphenol, 2,4-dichloro-3-methylphenol, 2,3,4-tfluorophenol, 2,3,6-trifluorophenol, 2,3,5-trifluorophenol, 2,3,4-trichlorophenol, 2,3,6-trichlorophenol, 2,3,5-trimethylphenol, 3,4,5-trimethylphenol, 4-chloro-3,5-dimethylphenol, 4-bromo-3,5-dimethylphenol, 2,4-trimethylphenol, 2,6-di-tertutyl-4-methylphenol, 2,6-di-tert-butyl-4-methoxyphenol, 4-sec-butyl-2,6-di-tert-butylphenol, 2,4,6-tri-tert-buiylphenol, 2,4,6-triphenylphenol, 2,4-trifluorophenol, 2,4,6-trifluorophenol, 2-chloro-3,5-difluorophenol, 2,4,6-trichlorophenol, 3,4,5-trimethoxyphenol, 2,4-di-tert-butyly-4-methoxybenzyl)phenol, 2,3,5-trichlorophenol, 4-bromo-2-dimethylphenol, 4-bromo-2,6-di-tert-butylphenol, 4-bromo-6-chloro-ocresol, 2,6-dibromo-4-methylphenol, 2,6-dichloro-4-fluorophenol, 2,6-dibromo-4-fluorophenol, 2,4,6-tribromophenol, 2,4,6-triodophenol, 2-chloro-4,5-dimethylphenol, 4-chloro-2-isopropyl-5-methylphenol, 2-bromo-4-difluorophenol, 2,4,5-trichlorophenol, 2,3,5,6-tetrafluorophenol, 3,4,5,6-tetrabromo-o-cresol, 2,3,5,6-tetrafluoro-4-(trifluoromethyl) phenol, pentofluorophenol, pentachlorophenol, pentobromophenol, Vitamin E, 1-naphthol, 2-naphthol, 2-methyl-1-naphthol, 4-chloro-1-naphthol, 2,4-dichloro-1-naphthol, 4-methoxy-1-naphthol, 1-bromo-2-naphthol, 6-bromo-2-naphthol, 1,6-dibromo-2-naphthol, 7-methoxy-2-naphthol, 2-hydroxyfluorene, 9-phenanthrol, 1-hydroxypyrene, 2-hydroxydiphenylmethane, 2-(benzyloxy)phenol, 4-phenoxyphenol, 4-(4-(tfluoromethyl)phenoxy) phenol, 4-(benzyloxy)phenol, 2-phenylphenol, 3-phenylphenol, 4-phenylphenol, 4-(4-bromophenyl)phenol, 2,3,5,6-tetrafluoro-4-(pentafluorophenyl)phenol, 2,6-diphenylphenol, 4-hydroxydiphenylmethane, 4-cumylphenol, 4-chloro-2-(alphamethylbenzyl)phenol, benzyl alcohol, sec-phenethyl alcohol, alpha-(trifluoromethyl)benzyl alcohol, 2-phenyl-2-proponol, 1,2-diphenyl-2-propanol, 2-chloro-1-phenylethanol, 1-phenyl-1-propanol, 2-methyl-1-phenyl-1-propanol, 2,2-dimethyl-1-phenyl-1-proponol, 3-chloro-1-phenyl-1-propanol, 1-phenyl-1-butanol, 1-phenyl-1-deconol, alpha-cyclopropylbenzyl alcohol, cyclopropyldiphenylmethanol, 2-phenyl-1-cyclohexanol, benzhydrol, 1,1-diphenylethanol, triphenylmethanol, 2,2',4,4',4"-pentapentomethoxytriphenylmethanol, 2-phenethylbenzyl alcohol, 1,1,1,3,3,3-hexafluoro-2-phenyl-2-propanol, 2-methylbenzyl alcohol, 2-fluorobenzyl alcohol, 2-(trifluoromethyl)benzyl alcohol, 2-chlorobenzyl alcohol, 2-bromobenzyl alcohol, 2-iodobenzyl alcohol, alpha-methyl-2-(trifluoromethyl)benzyl olcohol, 2-bromo-alpha-methylbenzyl alcohol, 2-methoxybenzyl alcohol, 2-ethoxybenzyl alcohol, 2-methoxy-alphamethylbenzyl alcohol, 9-hydroxyxanthene, 3-methylbenzyl alcohol, 3-fluorobenzyl alcohol, 3-(trifluoromethyl)benzyl alcohol, alpha-methyl-3-(trifluoromethyl)benzyl alcohol, 3-chlorobenzyl alcohol, 3-bromobenzyl alcohol, 3-iodobenzyl alcohol, 3-methoxybenzyl alcohol, 3-phenoxybenzyl alcohol, 4-methyl benzyl alcohol, 4-ethylbenzyl alcohol, 4-isopropylbenzyl alcohol, 4-tert-butylbenzyl alcohol, 4-butylbenzyl alcohol, 4-fluorobenzyl alcohol, 4-(trifluoromethyl)benzyl alcohol, alphamethyl-4-(trIfluoromethyl)benzyl alcohol, 4-chlorobenzyl alcohol, 4-brormobenzyl alcohol, 4-methoxybenzyl alcohol, 4-ethoxybenzyl alcohol, 4-butoxybenzyl alcohol, 4-(trifluoromethoxy)benzyl alcohol, 4-fluoro-lpha-methylbenzyl alcohol, 1-(4-chlorophenyl) ethanol, 4,4-difluorobenzhydrol, 4,4'-dichlorobenzhydrol, 4,4'-dlchloro-cilpha-methylbenzhydrol, 4,4'-dimethoxybenzhydrol, 4-bromoalpha-methylbenzylalcohol, 4-methoxy-alpha-methylbenzylalcohol, 2,6-difluorobenzyl alcohol, 2,3-difluorobenzyl alcohol, 2-chloro-6-fluorobenzyl alcohol, 2-dichlorobenzyl alcohol, 2,3-dimethoxybenzyl alcohol, 2,4-dimethylbenzyl alcohol, 3,4-dimethylbenzyl alcohol, 2,5-dimethylbenzyl alcohol, 3,4-difluorobenzyl alcohol, 2,4-difluorobenzyl alcohol, 2,5 difluorobenzyl alcohol, 2,4-dichlorobenzyl alcohol, 3,4-dichlorobenzyl alcohol, alpha-(chloromethyl)-2,4-dichlorobenzyl alcohol, 2,5-dichlorobenzyl alcohol, 2,4-dimethoxybenzyl alcohol, 3,4-dimethoxybenzyl alcohol, 2,5-dimethoxybenzyl alcohol, 5-bromo-2-methoxybenzyl alcohol, piperonyl alcohol, 3,5-dimethylbenzyl alcohol, 3,5-bis(trifluoromethyl)benzyl alcohol, 2,4,6-trimethylbenzyl alcohol, 3,5-difluorobenzyl alcohol, 3,5-dichlorobenzyl alcohol, 3,5-dimethoxybenzyl alcohol, 2,3-dimethyl-4-methoxybenzyl alcohol, 2,4-dimethoxy-3-methylbenzyl alcohol, 2,3,4-trimethoxybenzyl alcohol, 3,4,5-trimethoxybenzyl alcohol, 2,4,5-trimethoxybenzyl alcohol, 1-(pentafluorophenyl)ethcinol, 2,3,4,6,6-pentafluorobenzyl alcohol, 2,3,4,5,6-pentabromobenzyl alcohol, 4-benzyloxy-3-methoxybenzyl alcohol, 4-biphenylmethanol, 4-stilbenemethanol, 4-benzyloxybenzyl alcohol, 3-benzyloxybenzyl alcohol, 2-methylbenzhydrol, 4-methylbenzhydrol, 4-chlorobenzhydrol, 2,3,4,5,6-pentafluorobenzhydrol, decafluorobenzhydrol, 1-indanol, 2-indanol, 2-bromo-1-indanol, 1-methoxy-2-indanol, 1,2,3,4-tetrohydro-naphthol, 4-chromanol, 2-hydroxymethyl-1,4-benzodioxon, 9-phenylxanthen-9-ol, 2-biphenylmethanol, 2-methyl-3-biphenylmethanol, 1-naphthalenemethanol, 2-naphthalenemethanol, 1-nophthaleneethanol, alpha-methyl-1-naphtholenemethanol, alpha-methyl-2-naphthalenemethanol, 9-hydroxyfluorene, 9-fluorenemethanol, 9-phenyl-9-fluorenol, 1-acenaphthenol, dibenzosuberol, dibenzosuberenol, 9-anthracenemethanol, 10-chloro-9-anthracenemethanol, 2,2,2-trifluoro-1-(9-anthryl)ethanol, 7,8,9,10-tetrahydrobenzo[A]pyren-7-ol, 1-pyrenemethanol, 1-pyrenebutanol, phenethyl alcohol, 1-phenyl-2-proponol, 2-phenyl-1-propanol, 2-methyl-1-phenyl-2-propanol, alpha-ethylphenethyl alcohol, beta-ethylphenethyl alcohol, 2-methoxy-2-phenylethanol, 1-phenyl-2-pentanol, 3-phenyl-1-propanol, 3,3-diphenyl-1-proponol, 2,2-diphenylethanol, 2-(4-chlorophenyl)-1,1-diphenylethonol, 1,1-diphenyl-2-propanol, beta-methoxy-alpha-phenylphenethyl alcohol, 2,2-dimethyl-3-phenyl-1-proponol, alpha,alpha-dimethylbenzeneproponol, 4-phenyl-1-butanol, 3-phenyl-1-butanol, 2-phenyl-2-butanol, 5-phenyl-1-pentanol, 6-phenyl-1-hexanol, 8-phenylmenthol, cinnomyl alcohol, 2-phenyl-3-methyl-2-propen-1-ol, 2-phenoxyethanol, 2-(2,6-diisopropylphenoxy)ethanol, 2-(2-chlorophenoxy)ethanol, 2-(2,3,6-trifluorophenoxy)ethanol, 2-benzyloxyethonol, 1-phenoxy-2-propanol, 1,3-ibenzyloxy-2-propanol, 3-benzyloxy-1-propanol, 5-benzyloxy-1-pentanol, 4-benzyloxy-2-buten-1-ol, 1-phenyl-1-cyclopropanemethonol, 3-phenylglycidol, 2-methyl-3-phenylglycidol, 2-methylphenethyl alcohol, 2-fluorophenethyl alcoh ol, 2-trifluoromethyl)phenethyl alcohol, 2-chlorophenethyl alcohol, 2-bromophenethyl alcohol, 2-methoxyphenethyl alcohol, 2-methoxy-2-phenylethanol, 1-(2-methoxyphenyl)-2-propanol, 3-methylphenethyl alcohol, 3-(trifluoromethyl)phenethyl alcohol, 3-fluorophenethyl alcohol, 3-chlorophenethyl alcohol, 3-bromophenethyl alcohol, 3-methoxyphenethyl alcohol, 4-methylphenethyl alcohol, 4-fluorophenethyl alcohol, 4-chlorophenethyl alcohol, 4-bromophenethyl alcohol, 3-(4-bromophenyl)glycidol, 4-methoxyphenethyl alcohol, 3-(4-methoxyphenyl) 1-proponol, 2-(4-bromophenoxy)ethanol, 4-(4-methoxyphenyl)-1-butanol, 4-Chloro-alpha,alpha-dimethylphenethyl alcohol, 2,2-bis(4-chlorophenyl)ethanol, 1-(4-chlorophenyl)-1-cyclopentanemethanol, 2,4-dichlorophenethyl alcohol, 3,4-dimethoxyphenethyl alcohol, 4-ethoxy-3-methoxyphenethyl alcohol, 3-(3,4-dimethoxyphenyl)-1-propanol, or mixtures thereof, and the diamine is ethylene diomine, 1,3-diaminopropane, 1,2-diaminopropane, 1,4-diaminobutane, 1,2-diamino-2-methylpropone, 1,3-diaminopentane, 1,5-diaminopentone, 2,2-dimethyl-1,3-propanediamine, hexamethylenediamine, 2-methyl-1,5-diaminopentane, 1,7-diaminoheptane, 1,8-diaminooctone, 2,2,4-trimethyl-1,6-diaminohexane, 2,4,4-trimethyl-1,6-diaminohexane, 1,9-diaminononone, 1,10-diaminodecone, 1,12-diaminododecane, N-ethylethylenediamine, N-propylethylenediamine, N-isopropylethylenediamine, N,N'-dimethylethylenediomine, N,N'-diethylethylenediamine, N,N'-diisopropylethylenedlamIne, N-methyl-1,3-proponediamine, N-propyl-1,3-propanediamine, N-isopropyl-1,3-propanediamine, N,N'-dimethyl-1,3-propanediamine, N,N'-diethyl-1,3-propanediamine, N,N'-diisopropyl-1,3-propcinediamine, 2-butyl-2-ethyl-1,5-pentanediamine, N,N'-dimethyl-1,6-hexanediamine, 3,3'-diamino-N-methyldipropylamine, N,N',N"-trimethylbis(hexamethylene)triamine, 5-amino-2,2,4-trimethyl-1-cyclopentanemethylamine, 4,4'-methylenebis(cyclohexylamine), 4,4'-methylenebis(2-methylcyclohexylamine), 1,2-diaminocyclohexane, 1,4-iaminocyclohexane, N,N'-bis(3,3-dimethylbutyl 1,2-cyclohexonediamine, 1,3-cyclohexonebis(methylamine), N-cyclohexyl-1,3-propanediamine, 1,8-diamino-p-menthane, 5-amino-1,3,3-trimethylcyclohexanemethylamine, N,N'-diethyl-2-butene-1,4-diamine, 2,2'-oxybis(ethylamine), 2,2'-(ethylenedioxy)-bis(ethylamine), 4,9-dioxa-1,12-dodeconediamine, 4,7,10-trioxa-1,13-trideconediamine, 3-aminopyrrolidine, 2-(aminomethyl)pyrrolidine, 4,4'-bipiperldine, 4,4'-ethylenedipiperidine, 4,4'-dimethylenedipiperidine, 3-aminopiperidlne, 4-(aminomethyl)piperidine, 3-(4-aminobutyl)piperidine, 4-amino-2,2,6,6-tetramethylpiperidine, piperazine, 2-methylpipercazine, 2,6-dimethylpiperazine, 2,5-dimethylpiperazine, 1-(2-aminoethyl)piperazine, 1,4-bis(3-aminopropyl)piperazine, homopiperazine, 1,4,10-trioxa-7-13-diazacyclopentodecane, 1,4,10,13-tetraoxa-7,16-diazacyclooctadecane, 1,2-dianilinoethane, 2,2'-ethylenedianiline, 2-aminophenyldisulfide, 4,4'-ethylenedianiline, 3,3'-methylenedianiline, 4,4'-methylenedianiline, 4,4'-methylenebis(3-chloro-2,6-diethylaniline), 4,4'-diaminostilbene, 4,4'-oxydianiline, 4",4'"-(hexafluoroisopropylidene)-bis(4-phenoxyonlline), 4,4'-thiodianiline, 4-aminophenyldisulfide, O-tolidine, 4,4-ethylenedi-m-toluidine, 5,5'-(hexafluoroisopropylidene)-di-o-toluidine, 4,4'-methylenebis(2,6-dimethylaniline), 4,4'-methylenebis(2,6-diethylaniline), 4,4'-methylenebis(2,6-diisopropylaniline), 3,3',5,5'-tetramethylbenzidine, 4,4'-diaminooctafluorobiphenyl, 1,2-phenylenediamine, N-methyl-1,2-phenylenediamine, 2,3-diaminotoluene, 3,4-diaminotoluene, 4-chloro-1,2-phenylenediamine, 4-methoxy-1,2-phenylenediamine, 4,5-dimethyl-1,2-phenylenediamine, 4,5-dichloro-1,2-phenylenediamine, N-phenyl-1,2-phenylenediamine, 1,3-phenylenediamine, 2,6-diaminotoluene, 2,4-diaminotoluene, 2,4,6-trimethyl-1,3-phenylenediamine, 4-methoxy-1,3-phenylenediamine, 1,4-phenylenediamine, N,N'-diphenyl-1,4-phenylenediamine, 2,5-diominotoluene, 2,5-dimethyl-1,4-phenylenediamine, 2-chloro-1,4-phenylenediamine, 2,5-dichloro-1,4-phenylenediamine, 2-methoxy-1,4-phenylenediamine, 2-methoxy-N-phenyl-1,4-phenylenediamine, 2,3,5,6-tetramethyl-1,4-phenylenediamine, N,N'-diphenylbenzidine, N-phenyl-1,4-phenylenediamine, N-methyl-4,4'-methylenedianiline, 3,3'-(hexafluoroisopropylidene)dianiline, 4,4'-(hexafluoroisopropylidene)dianiline, 3,3-dimethoxybenzidine, N-(4-methoxyphenyl)-1,4-phenylenediamine, N-(1-naphthyl)-ethylenediamine, 3,3'-dimethylnaphthidine, 2,2'-dithiobis(1-naphthylamine), 2,3-diaminonaphthalene, 1,5-diaminonaphthalene, 1,8-diominonaphthalene, 1,1'-binaphthyl-2,2'-diamine, 2,7-diaminofluorene, 3,7-diamino-2-methoxyfluorene, 9,10-diaminophenanthrene, N-phenylethylenedlamine, 1,2-diphenylethylenediamine, 1,2-bis(4-methoxyphenyl)ethylenediamine, N,N'-dibenzylethylenediamine, 2-aminobenzylamine, m-xylylenediamine, N,N'-dimethyl-1,2-bis (3-(trifluoromethyl)phenyl)-1,2-ethanediamine, p-xylylenediamine, 4-aminobenzylamine, 4-(hexadecylamino)benzylamine, 2-(4-aminophenyl)ethylamine, 2-(anilinomethyl)pyrrolidine, 1-(5-chloro-2-(methylamino)phenyl)-1,2,3,4-tetrahydroisoquinoline tartrate, or mixtures thereof.

15. An ink according to claim 13 wherein the total number of carbon atoms in $R_1+R_2+R_3$ is at least about 72, and wherein the total number of carbon atoms in $R_1+R_2+R_3$ is no more than about 260.

16. An ink according to claim 13 wherein the total number of carbon atoms in $R_1+R_2+R_3$ is at least about 90, and wherein the total number of carbon atoms in $R_1+R_2+R_3$ is no more than about 150.

17. An ink according to claim 12 wherein the ester-amide material is of the formula

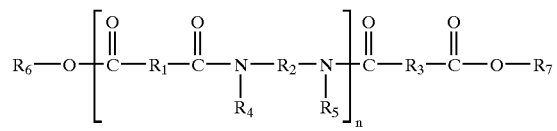

wherein n is an integer of 1, 2, 3, 4, 5, 6, 7, 8, 9, or 10, $R_1$ and $R_3$ each, independently of the other, is (i) an alkylene group, (ii) an arylene group, (iii) an arylalkylene group, or (iv) an alkylarylene group, $R_6$ and $R_7$ each, independently of the other, is (i) an alkyl group, (ii) an aryl group, (iii) an arylalkyl group, or (iv) an alkylaryl group, $R_2$ is (i) an alkylene group, (ii) an arylene group, (iii) an arylalkylene group, or (iv) an alkylarylene group, and $R_4$ and $R_5$ each, independently of the other, is (i) a hydrogen atom, (ii) an alkyl group, (iii) an aryl group, (iv) an arylalkyl group, or (v) an alkylaryl group.

18. An ink according to claim 1 wherein the colorant is present in the ink in an amount of at least about 0.1 percent by weight of the ink, and wherein the colorant is present in the ink in an amount of no more than about 50 percent by weight of the ink.

19. A process which comprises (a) incorporating into an ink jet printing apparatus a phase change ink composition comprising (1) an ink carrier comprising (A) a first component which comprises an ester-amide material, and (B) a second component which comprises a material selected from the group consisting of (i) a mixture of a first urethane resin derived from the reaction of two equivalents of hydroabietyl alcohol and one equivalent of isophorone diisocyanate and a second urethane resin that is the adduct of three equivalents of stearyl isocyanate and a glycerol-based propoxylate alcohol, (i) urea compounds, (c) urethane-urea compounds, and (d) mixtures thereof; and (2) a colorant; (b) melting the ink; and (ii) causing droplets of the melted ink to be ejected in an imagewise pattern onto a substrate.

20. A process according to claim 19 wherein the printing apparatus employs a piezoelectric printing process wherein droplets of the ink are caused to be ejected in imagewise pattern by oscillations of piezoelectric vibrating elements.

21. A process according to claim 19 wherein the substrate is a final recording sheet and droplets of the melted ink ore ejected in an imagewise pattern directly onto the final recording sheet.

22. A process according to claim 19 wherein the substrate is an intermediate transfer member and droplets of the melted ink are ejected in an imagewise pattern onto the intermediate transfer member followed by transfer of the imagewise pattern from the Intermediate transfer member to a final recording sheet.

23. A process according to claim 22 wherein the intermediate transfer member is heated to a temperature above that of the final recording sheet and below that of the melted ink in the printing apparatus.

* * * * *